US011091608B2

(12) United States Patent
Galimberti et al.

(10) Patent No.: US 11,091,608 B2
(45) Date of Patent: Aug. 17, 2021

(54) ELASTOMERIC COMPOSITION AND VULCANIZATION ACCELERATOR USED THEREIN

(71) Applicants: Pirelli Tyre S.p.A., Milan (IT); POLITECNICO DI MILANO, Milan (IT)

(72) Inventors: Maurizio Stefano Galimberti, Milan (IT); Roberto Sebastiano, Milan (IT); Vincenzina Barbera, Milan (IT); Valeria Rosaria Cipolletti, Milan (IT); Gabriella Leonardi, Milan (IT); Shuquan Sun, Beijing (CN); Luigia Rossiello, Milan (IT)

(73) Assignee: PIRELLI TYRE S.p.A., Milan (IT)

( * ) Notice: Subject to any disclaimer, the term of this patent is extended or adjusted under 35 U.S.C. 154(b) by 629 days.

(21) Appl. No.: 16/065,587

(22) PCT Filed: Dec. 23, 2016

(86) PCT No.: PCT/IB2016/057977
§ 371 (c)(1),
(2) Date: Jun. 22, 2018

(87) PCT Pub. No.: WO2017/115253
PCT Pub. Date: Jul. 6, 2017

(65) Prior Publication Data
US 2021/0179821 A1 Jun. 17, 2021

(30) Foreign Application Priority Data

Dec. 30, 2015 (IT) .................. 102015000089306

(51) Int. Cl.
| | |
|---|---|
| *C08L 9/06* | (2006.01) |
| *C08F 36/06* | (2006.01) |
| *C08L 23/16* | (2006.01) |
| *C08L 23/22* | (2006.01) |
| *C08K 5/17* | (2006.01) |
| *C08K 5/20* | (2006.01) |
| *C08K 5/29* | (2006.01) |
| *C08K 5/353* | (2006.01) |
| *C08K 5/44* | (2006.01) |
| *C08K 5/3472* | (2006.01) |
| *C08K 5/38* | (2006.01) |
| *C08K 3/04* | (2006.01) |
| *C08K 3/36* | (2006.01) |
| *C08K 3/06* | (2006.01) |
| *C08K 3/22* | (2006.01) |
| *C08K 3/26* | (2006.01) |
| *B60C 1/00* | (2006.01) |
| *C08L 7/00* | (2006.01) |

(52) U.S. Cl.
CPC .................... *C08L 9/06* (2013.01);
*B60C 1/00* (2013.01); *C08F 36/06* (2013.01);
*C08K 3/04* (2013.01); *C08K 3/06* (2013.01);
*C08K 3/22* (2013.01);
*C08K 3/26* (2013.01); *C08K 3/36* (2013.01);
*C08K 5/17* (2013.01); *C08K 5/20* (2013.01);
*C08K 5/29* (2013.01); *C08K 5/3472* (2013.01);
*C08K 5/353* (2013.01); *C08K 5/38* (2013.01);
*C08K 5/44* (2013.01); *C08L 7/00* (2013.01);
*C08L 23/16* (2013.01); *C08L 23/22* (2013.01);
*C08K 2003/2227* (2013.01); *C08K 2003/265* (2013.01); *C08L 2205/03* (2013.01)

(58) Field of Classification Search
CPC .. B60C 1/00; C08F 36/06; C08K 3/04; C08K 3/06; C08K 3/22; C08K 3/26; C08K 3/36; C08K 5/17; C08K 5/20; C08K 5/29; C08K 5/353; C08K 5/44; C08K 5/3472; C08K 5/38; C08K 2003/2227; C08K 2003/265; C08L 9/06; C08L 23/16; C08L 23/22; C08L 7/00; C08L 2205/03
See application file for complete search history.

(56) References Cited

U.S. PATENT DOCUMENTS

| | | | |
|---|---|---|---|
| 4,861,842 | A | 8/1989 | Cohen et al. |
| 5,187,239 | A | 2/1993 | Parks et al. |
| 6,025,428 | A | 2/2000 | Day |
| 7,795,356 | B2 | 9/2010 | Mihara et al. |

(Continued)

FOREIGN PATENT DOCUMENTS

| | | |
|---|---|---|
| CA | 703198 | 2/1965 |
| CN | 103865125 | 6/2014 |

(Continued)

OTHER PUBLICATIONS

International Search Report from the European Patent Office in corresponding International Application No. PCT/IB2016/057977 dated May 1, 2017.

(Continued)

*Primary Examiner* — Patrick D Niland
(74) *Attorney, Agent, or Firm* — Finnegan, Henderson, Farabow, Garrett & Dunner, L.L.P.

(57) ABSTRACT

The present invention relates to a vulcanizable elastomeric composition comprising a secondary accelerator that may be used in combination with sulphenamide alone, completely avoiding the use of a guanidine. Moreover, said accelerator promotes dispersion of the silica in the compound and migrates with difficulty in the elastomeric composition itself. The invention also relates to the use of a vulcanization accelerator for said elastomeric composition, to the associated vulcanization process and to a tyre comprising same.

34 Claims, 7 Drawing Sheets

(56) References Cited

U.S. PATENT DOCUMENTS

| | | |
|---|---|---|
| 7,923,493 B2 | 4/2011 | Mihara et al. |
| 2014/0275402 A1* | 9/2014 | Fujii ..................... C08F 36/04 524/554 |
| 2014/0323627 A1 | 10/2014 | Yagi et al. |
| 2015/0158994 A1 | 6/2015 | Darnaud et al. |

FOREIGN PATENT DOCUMENTS

| | | |
|---|---|---|
| CN | 104140574 | 11/2014 |
| CN | 104629116 | 5/2015 |
| EP | 1 939 220 | 7/2008 |
| WO | WO 2004/052983 | 6/2004 |

OTHER PUBLICATIONS

Written Opinion of the International Searching Authority from the European Patent Office in corresponding International Application No. PCT/IB2016/057977 dated May 8, 2017.

* cited by examiner

ELASTOMERIC COMPOSITION AND VULCANIZATION ACCELERATOR USED THEREIN

CROSS REFERENCE TO RELATED APPLICATIONS

This application is a Section 371 national phase application based on International Application No. PCT/162016/057977, filed Dec. 23, 2016, which claims the priority of Italian Patent Application No. 102015000089306, filed Dec. 30, 2015; the contents of each application expressly incorporated herein by reference.

DESCRIPTION

The present invention relates to a vulcanizable elastomeric composition, the use of a vulcanization accelerator for said composition, the associated vulcanization process and a tyre comprising same.

In particular, the invention relates to vulcanizable elastomeric compositions to be used in tyre production.

Rubbers are endowed with so-called entropic elasticity. The polymer chains in rubber have certain characteristics: (i) they have a high molecular weight, (ii) at rest, they typically give rise to an amorphous phase, (iii) they do not have strong intermolecular attractions between them (primarily London forces), (iv) as a result of the last three aforementioned characteristics, they are capable of switching between various conformations with low expenditure of energy.

The chains of a polymer suitable for obtaining a rubbery material are therefore capable, if subjected to an elongation stress, of uncoiling from the random ball that they assume in the state of rest (i.e. when stresses are not applied to them). It is in fact known that a rubbery material can be elongated considerably, even up to 10 times its initial length. According to the definition in ISO 1382 (1982) for Rubber—Vocabulary, rubber is defined thus: "a class of polymeric materials that are flexible and elastic. A rubber may be deformed substantially under stress, but quickly recovers to approximately its initial shape when the stress is removed." The Glossary of terms relating to Rubber and Rubber-Like materials gives the ASTM definition No. 184, 1956 of elasticity: "the property of a material by virtue of which said material tends to recover its original size and shape, after the stress causing the deformation has been removed, such as tensile, compressive or torsional stress." Therefore an elastic rubber must possess the property of elastic recovery.

As already stated, it is entropic elasticity that leads rubber to have elastic recovery. Imagine applying a stress to a test specimen of material capable of being elongated, such as rubber. When the polymer chains that are in the random ball are uncoiled, there is a decrease in entropy. If the chains are not joined together by chemical bonds, they slide over one another, dissipating energy. Moreover, they are free to move independently of one another and, maintaining the test specimen at the elongation reached, there is recovery of entropy owing to said movements. The test specimen therefore remains at the elongation reached and elastic recovery does not occur. There is no thermodynamic reason for elastic recovery. If the polymer chains are instead joined together by chemical bonds, following elongation of the test specimen there is no dissipation of energy and there is a decrease in entropy. Since the chains are only able to move cooperatively, the only way of recovering the initial level of entropy is return to the initial state—recovery of the original size and shape of the test specimen.

To allow entropic elasticity to be expressed, it is necessary to join the chains together chemically. This is achieved as a result of the crosslinking process. It is known to be possible to crosslink a rubber based on polymer chains containing double bonds with sulphur. Sulphur-based crosslinking is known as vulcanization. According to A. Y. Coran, chapter 7 of *The Science and Technology of Rubber Third Ed.*; Mark, J. E.; Erman, B.; Eirich, F. R. Eds. Elsevier Academic Press 2005, vulcanization is a process that produces chemical crosslinks between polymer chains. In the case of vulcanization, i.e. sulphur-based crosslinking, a crosslink may be formed by a group of sulphur atoms in a short chain or by a single sulphur atom.

Nevertheless, crosslinking based on sulphur alone requires a notable amount of sulphur, for example 8 parts of sulphur per 100 parts of rubber, and takes a very long time, for example 5 hours at 140° C. Vulcanization times remain long even in the typical temperature range employed industrially: 150-170° C. Therefore vulcanization with sulphur alone is not of practical interest in industry. About 65 years after the discovery of sulphur-based vulcanization, organic chemicals began to be used with the role of accelerator. The first accelerator used was an amine, aniline. However, aniline proved too toxic to be used in the production of rubber products. Therefore products less toxic than aniline were introduced, such as thiocarbanilide and then guanidines. The aliphatic amines were then reacted with carbon disulphide, obtaining the dithiocarbamates, which were then used as accelerators. The dithiocarbamates are still the most active accelerators in terms of speed of crosslinking and crosslink density. Many of the dithiocarbamates give vulcanization induction times (so-called scorch time) that are too short. The dithiocarbamates are therefore problematic for the processability of elastomer compounds. Therefore the accelerators of the thiazole series were introduced: mercaptobenzothiazole and mercaptobenzothiazole disulphide, which slow down the vulcanization reaction relative to the dithiocarbamates. Then the benzothiazole sulphenamides were introduced, which increase the induction time but guarantee quick vulcanization. Development of vulcanization science and technology then led to the use of mixtures of accelerators. Typically, an accelerator in the benzothiazole class is used in combination with smaller amounts of another accelerator that causes activation of vulcanization, such as a dithiocarbamate or an amine or a guanidine. Thus, the use of a mixture of accelerators, and in particular a particularly active accelerator in combination with an accelerator of the benzothiazole class (sulphenamides), leads to better vulcanization kinetics and better network structure.

The accelerators are in fact subdivided into primary accelerators, such as the benzothiazoles/sulphenamides, and secondary accelerators, also called ultra-accelerators.

The guanidines belong to the class of secondary accelerators. They are bases which, if used as the only type of accelerator, do not give rise to a particularly quick start of vulcanization, nor to vulcanization that is particularly quick. The guanidines, if used as secondary accelerators, in combination with an accelerator of the thiazole class, have a powerful activating effect, owing to the vulcanization kinetics, which becomes much faster. A guanidine as secondary accelerator mainly gives rise to high elastic modulus, high breaking load, high resilience, and therefore good dynamic mechanical properties, and good resistance to ageing. They are therefore used in industrial practice, in particular in the case of silica-based compounds, which require a secondary accelerator. It is known, moreover, that guanidine promotes dispersion of silica. The guanidines known and used in the rubber industry are: di-ortho-tolylguanidine and, in particular, diphenylguanidine (DPG). Therefore it is correct to speak of the guanidine family, even if the guanidine used in industrial practice is essentially DPG. The structure of DPG is shown below.

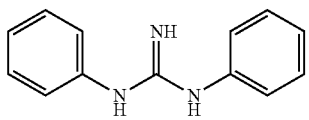 [SMILES: N=C(Nc1ccccc1)Nc1ccccc1]

However, the use of DPG is problematic, considering the hazard statements by which it is characterized. These are as follows. H302: Harmful if ingested. H315: Causes skin irritation. H319: Causes severe eye irritation. H335: May irritate the respiratory tract. H361f: Suspected of harming fertility. H411: Toxic for aquatic organisms with long-term effects. H341: Suspected of causing genetic changes. H351: Suspected of causing cancer. H372: Causes damage to organs in the case of prolonged or repeated exposure.

Moreover, from a strictly technical viewpoint, the activating effect of a guanidine may represent a problem. In fact, in industry, before carrying out vulcanization, the compounds must be processed, in order to transform them to the required physical form. During the processing step, the compounds may be subjected to notable shear stresses, which typically cause a considerable increase in temperature. Owing to the presence of an efficient secondary accelerator, such as a guanidine, there is incipient vulcanization, the so-called "scorch" phenomenon. In the rubber materials industry, in fact tests are carried out for measuring the so-called "scorch time" of a compound, i.e. the tendency of a compound to develop premature vulcanization, causing an increase in rigidity of the compounds at a temperature typical of the process for transforming said compound.

Moreover, from a technical viewpoint, guanidine may migrate in the rubber compound in which it is supplied and reach the neighbouring compounds, altering the composition of the vulcanization system therein. In a manufactured product such as a tyre this may represent a critical factor. For example, there may be undesirable mixing of guanidine in a compound rich in primary accelerators, with consequent activation of vulcanization and problems connected with the scorch time, and with increase in crosslink density, generating a rigid area perhaps at the interface between two compounds. This is a considerable problem, for example in a tyre: rigidity at the interface between two adjacent compounds may be a potential cause of separation between various parts of the tyre.

Compounds in which secondary accelerators and in particular the guanidines are generally used are the silica-based compounds. It is in fact known that compounds that contain silica are characterized by slower vulcanization, so that, if vulcanized in the standard conditions of the other compounds, they display the so-called "marching modulus" phenomenon, i.e. a modulus that is still increasing at the moment when vulcanization is interrupted. The secondary accelerator, preferably guanidine, is therefore used to achieve optimum vulcanization in standard times.

The silica-based compounds were introduced on a large scale in the elastomer materials industry, and in particular in the tyre industry, since they promote less dissipation of energy even in the presence of large dynamic mechanical stresses, such as precisely those expected when tyres are in use. To have low dissipation of energy, there must be a small decrease in elastic modulus with increase in the amplitude of dynamic stressing, i.e. a slight non-linearity of the modulus. This reduction in elastic modulus with increase in the amplitude of dynamic stressing is a phenomenon known as the Payne effect, named after the scientist who first explained it. To have a low Payne effect, in the prior art, silica is bound chemically to the elastomer or elastomers that make up the matrix of the elastomeric composition, by using coupling agents. Moreover, chemical compounds are used, for example fatty acids such as stearic acid, which perform the function of coating the silica, making it compatible with the elastomer, therefore promoting its dispersion in the elastomeric matrix, preventing silica-silica interaction, reduction of which as a result of dynamic stress would cause dissipation of energy.

In the prior art there are patents and publications that report rubber compositions that comprise chemical compounds used for the purpose of eliminating DPG as secondary accelerator, or at least reducing the amount of DPG used. Chemical compounds of various kinds are mentioned in these documents. These chemical compounds may also have the role of coating the silica and/or of promoting coupling of the silica with the elastomer and/or of promoting dispersion of the silica in the elastomeric matrix.

Patent application U.S. Pat. No. 4,861,842 A, published on 29 Aug. 1989, presents a composition comprising a chemical compound, called an activator, which is a quaternary ammonium salt, having the following formula:

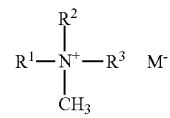

in which $R^1$, $R^2$ and $R^3$ are independently alkyl radicals with 8 to 10 carbon atoms and M is selected from a group consisting of Cl, Br, $CH_3SO_4$ and $HSO_4$. The composition further comprises a sulphenamide, a guanidine, a thiuram, a mercaptobenzothiazole disulphide, a sulphur-based vulcanizing agent, a cyclohexylthiophthalimide and a zinc compound. It is said that the composition has very quick vulcanization, without premature vulcanization, during the injection moulding process. This composition appears to be very complex and rich in particular in active ingredients in vulcanization of a lipophilic character, which may therefore easily migrate in the compound. In particular, the activator consisting of a quaternary ammonium salt has alkyl radicals as substituents of the nitrogen atom. Therefore this activator is readily soluble in a lipophilic matrix. It should be noted that in this ammonium salt there is no other functional group besides the quaternary nitrogen (with the counter-ion). In the activator there is therefore only the functional group that can become active in vulcanization. Therefore there is no other functional group that could anchor the activator to a support, such as a reinforcing filler for example. Moreover, the examples are either only with carbon black or also with a small amount of silica. It should also be pointed out that a cation in an elastomer compound based on sulphur compounds may interact with sulphur-containing compounds such as thiolates. If, on the one hand, this is one of the causes of acceleration of vulcanization, on the other hand it promotes migration of the ammonium salt.

Patent application U.S. Pat. No. 5,187,239, published on 16 Feb. 1993, describes the addition, to a rubber vulcanizable with sulphur, of a methyl trialkylammonium salt that has the following formula:

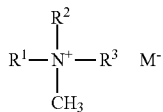

in which $R^1$, $R^2$ and $R^3$ are independently alkyl radicals with 8 to 10 carbon atoms and M is selected from a group consisting of Cl, Br, $CH_3SO_4$ and $HSO_4$. In one embodiment, just one accelerator is used, for example a sulphenamide. In another embodiment, a combination of two or more accelerators may be used, such as a guanidine, a dithiocarbamate or a thiuram. Adding the methyl trialkylammonium salt would significantly increase the rate of vulcanization. This patent seems to be substantially similar to the preceding one. In particular, methyl trialkylammonium appears to be readily soluble in a lipophilic matrix and therefore can easily migrate in a compound based on hydrocarbon elastomers, for example diene elastomers. The examples refer to compositions based only on carbon black. Again in this case, there is mention of possible interaction of the ammonium cation with the thiolates, with the effects noted above.

U.S. Pat. No. 6,025,428 describes a sulphur-vulcanizable composition that contains silica, with optimization of the properties associated with the presence of silica, such as abrasion, road holding in wet conditions and rolling resistance. These properties are improved by using silica dispersants and coupling agents, including a quaternary ammonium salt that has the following formula:

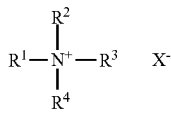

in which $R^1$, $R^2$, $R^3$ and $R^4$, which may be identical or different, are alkyls, aryls and polyoxyethylene and X is a halogen. Using the ammonium salt given in the general formula, the vulcanization delay due to the presence of silica is reduced. A further advantage reported is that a secondary accelerator such as diphenyl guanidine should no longer be necessary. In this patent, silica dispersants and coupling agents are therefore ammonium salts, characterized by the presence of alkyl or aryl radicals or poly(oxyalkylene)s as substituent of the nitrogen. As demonstrated by the examples given in the text of the patent, the alkyl radicals cause a substantial decrease in the values of viscosity as well as of moduli at high elongation. This means that the alkyl radicals act as plasticizers of the compound. Therefore, although there is a slight Payne effect, a positive feature, the compound suffers from the reduction of the moduli. This even happens when a substituent of the nitrogen atom is the polyoxyalkylene chain. Moreover, this last type of substituent is known to accelerate the compounds. Although this effect may be desirable during vulcanization it is certainly negative during processing of the compounds. Moreover, no data are given on incipient crosslinking at temperatures typical of processing (the traditional test is carried out at 127° C.). Finally, in this case too, there is mention of possible interaction of the ammonium cation with the thiolates, with the effects noted above.

In patent application WO 20004 052983 A1, an elastomeric composition is described that comprises, as secondary accelerator, at least one quaternary ammonium salt that comprises at least one non-ionic nitrogen atom. Even in the substantial absence of a secondary accelerator, adding this ammonium salt gives a crosslinked compound that has good mechanical properties (both static and dynamic), maintaining an acceptable rate of vulcanization.

The general formula of the quaternary ammonium salt is as follows:

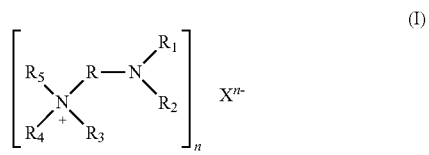

in which:

R represents a $C_1$-$C_{22}$ linear or branched alkenyl group, $C_2$-$C_{22}$ linear or branched alkylidene, a $C_6$-$C_{18}$ aryl group; a $C_7$-$C_{20}$ alkylaryl group, all these groups optionally containing other heteroatoms. $R_1$ and $R_2$, which may be identical or different, represent a $C_1$-$C_{22}$ linear or branched alkenyl group, $C_2$-$C_{22}$ linear or branched alkylidene, a $C_6$-$C_{18}$ aryl group; a $C_7$-$C_{20}$ alkylaryl group. $R_1$ and $R_2$ may also form, with the nitrogen atom, a ring that may contain a second heteroatom. $R_3$, $R_4$ and $R_5$, which may be identical or different, represent a $C_1$-$C_{22}$ linear or branched alkenyl group, $C_2$-$C_{22}$ linear or branched alkylidene group, a $C_6$-$C_{18}$ aryl group; a $C_7$-$C_{20}$ alkylaryl group, a group having the following formula:

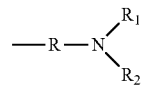

in which R, $R_1$ and $R_2$ have the same meaning as given above and two out of $R_3$, $R_4$ and $R_5$, together with the nitrogen atom to which they are bound, may form a $C_5$-$C_{18}$ heterocycle that may contain a second heteroatom. $X^{n-}$ represents an organic or inorganic anion; n represents 1, 2 or 3.

This secondary accelerator bears, within its molecular structure, two active principles in vulcanization. Certainly non-ionic nitrogen, but also ionic nitrogen. The molecules claimed certainly appear to be compatible and soluble in the elastomer compounds, therefore with possibility of migration. This possibility seems particularly pronounced when the counter-ion is stearic acid. Moreover, the presence of two active functional groups may make the processability of the compound problematic, promoting incipient vulcanization at low temperature and yet may promote premature crosslinking, with induction times that are too short, at the temperature decided for vulcanization.

U.S. Pat. No. 7,795,356 B2, published on 14 Sep. 2010, presents a rubber composition that comprises a chemical compound having a piperidine skeleton, used for the purpose of improving the dispersibility of the silica and the rate of vulcanization, the reinforceability and the viscoelastic properties of the rubber composition, without using DPG or by decreasing the amount of DPG. In particular, the dispersibility of the silica is investigated by means of dynamic mechanical tests, applying sinusoidal shearing stresses and measuring the decrease in elastic modulus between 0.28% and 100% of elongation. The viscoelastic property considered is the ratio of the loss modulus to the elastic modulus, i.e. the tangent of angle δ (tan δ) at 60° C. The rubber composition is designed for applications in a tyre. The compound having the piperidine backbone is also used for reducing migration of the secondary accelerator into an adjacent part of the tyre. The chemical compound having a piperidine skeleton seems to be similar to a guanidine. In fact, owing to conjugation, the doublets of the nitrogens are delocalized. When there is no other functional group other than nitrogen, it may be assumed there will be migration of the molecule in the lipophilic matrix.

U.S. Pat. No. 7,923,493 B2, published on 12 Apr. 2011, presents a rubber composition that comprises a tertiary amine, characterized in that the nitrogen of the tertiary amine belongs to a cyclic compound, such as in 1-azabicyclo [2,2,2](quinuclidine). The purpose of this composition is to improve the properties in the unvulcanized state, such as Mooney viscosity and scorch resistance, and the properties in the vulcanized state, such as the viscoelastic properties, abrasion resistance, without the need to use DPG or by decreasing the amount of DPG. This patent is the continuation of the preceding patent. Therefore the same comments may be made.

A dithiophosphate (DTP) is used in the article "Alternative Secondary Accelerator for Silica-Filled Natural Rubber Formulations" published in Kautschuk Gummi and Kunststoffe in the September issue of 2013. Two examples of dithiophosphate are given: bis(ethylhexyl thiophosphoryl) polysulphide and zinc dibutyldithiophosphate salt. It is reported that these compounds show good efficiency in improving the properties of a silica-based compound when it is used as secondary accelerator in combination with a sulphenamide as primary accelerator. It is also reported that DTP is more reactive than DPG and gives less reversion, a smaller quantity of it having to be used, and obtaining better resistance of the compound to ageing. An increase in bound rubber is reported, with a decrease of the Payne effect, and it is postulated that DTP can function as a coupling agent. DTP and DPG are used in amounts equal to 1.4 and 2.0 wt %, relative to the silica content. Nevertheless, looking at the safety data sheet of bis(ethylhexyl thiophosphoryl)polysulphide, we read that it may cause allergic skin reactions and that it is toxic to aquatic organisms, with long-term effects. In the case of the zinc dibutyldithiophosphate salt, we read that it may cause skin irritation, severe eye irritation and respiratory irritation. Moreover, the dithiophosphates are very effective accelerators. It is known that dithiophosphates may allow the use of shorter crosslinking times. That is, they are very active secondary accelerators. Therefore they may cause problems due to unwanted or premature vulcanization. Moreover, it is known that dithiophosphates are used for decreasing the reversion of a compound. This is due to the fact that they form short sulphur bridges, which may however be problematic for the rupture properties of a compound. In fact, the greater the relative quantity of short bridges, the lower the elongation at break will be.

Patent EP 1939220 B1 presents molecules that contain a functional group. This functional group is a primary amine. The following molecules are mentioned in claim 10 of this patent: 2-aminoethanol, N-(3-aminopropyl)-N,N-diethanolamine, 2-amino-2-methyl-1-propanol, 2-amino-1-butanol, 2-amino-2-ethyl-1,3-propanediol, 2-amino-2-methyl-1,3-propanediol, tris(hydroxymethyl)-aminomethane, or 2-amino-2-hydroxymethyl-1,3-propanediol, monoethanolamine, diethanolamine, triethanolamine, N-methylethanolamine, N, N-dimethylethanolamine, N, N-dibutylethanolamine, N, N-diethylethanolamine, N-methyl-N, N-diethanolamine, 2-amino-2-methylpropanol. In the patent, these molecules are used for modifying the chain ends of polymers produced by living anionic polymerization. In particular, the living polymer is terminated with alkoxysilanes and then these alkoxysilanes, having become chain ends, are modified with the molecules just mentioned. The polymers thus modified are used in elastomeric compositions containing silica, for applications in tyres. Better dispersion of silica is mentioned, with lower hysteresis at high T and higher hysteresis at low T. The polymer that is terminated firstly with alkoxysilanes and then with the molecules containing amines is a copolymer of styrene with 1,3-butadiene obtained by living anionic polymerization. The styrene-butadiene copolymers given in the examples have number-average molecular weight (Mn) equal to 188.9 kg/mol and 202.1 kg/mol. Stating the value of Mn makes sense, in the case of living polymerizations, since the molecular weight is almost monodiperse. Thus, it is evident that the molecule belonging to the aforementioned list is at the end of a long polymer chain, i.e. it is present in the polymer, and consequently in the compound, in a very small amount. To give a quantitative dimension to this statement, it is sufficient to consider the polymer given in examples 1 and 2 of the patent. 0.211 grams of ethanolamine is bound to 400 grams of styrene-butadiene copolymer modified with tetraethyl orthosilicate. This means that if 100 phr of this polymer is used in a compound, as is done in example 5, 0.053 phr of ethanolamine is used. In the prior art for silica-based elastomer compounds it is known that it is sufficient to have polar chain ends, even in the case of polymers with high molecular weight, for an appreciable reduction in silica crosslinking and therefore dissipation of energy. It is also known that such amounts cannot in any way influence the vulcanization parameters. Accordingly, the molecules given above, listed in claim 10 of patent EP 1939220 B1, if used as chain ends of polymers such as a copolymer of styrene and 1,3-butadiene, in the amount first reported, cannot promote quicker vulcanization.

One of the molecules just discussed, tris(hydroxymethyl) aminomethane, has been used in the prior art for compositions that also contain elastomers, for applications far from the aim of the present invention. For example, in CN 104629116 (2015), modified nitrile rubber is used for covering cables, with amounts of tris(hydroxymethyl)aminomethane between 1 and 1.4 parts by weight. In CN 104140574 (2014), a composition comprising isoprene rubber, chloroprene rubber and polyurethane rubber is used for heat resistance. In CN 103865125 (2014), a mixture of polyolefin elastomer, acrylate modified with silicone and poly(vinylchloride) is used as rubber for use in engines.

It would be desirable to have at our disposal a vulcanizable elastomeric composition comprising a secondary accelerator that could be used in combination with sulphenamide alone, completely avoiding the use of a guanidine.

It would also be desirable to have quick vulcanization of the elastomeric composition, but also a so-called scorch time that is not short.

It would also be desirable for the chemical compound that constitutes the secondary accelerator in the vulcanizable elastomeric composition to be able to promote dispersion of silica, thus favouring a smaller Payne effect.

Furthermore, it would be desirable if the chemical compound that constitutes the secondary accelerator migrates with difficulty in the vulcanizable elastomeric composition. For this purpose, it would be desirable for the chemical compound that constitutes the secondary accelerator to have a structure that contains at least one further functional group in addition to the functional group that performs the function of accelerating crosslinking. This further functional group should be able to anchor the molecule of secondary accelerator stably to a support that is not able to migrate in the compound, for example silica. To interact effectively with the silica, this further functional group should contain oxygen atoms.

Summarizing, the molecule that is to function as a secondary accelerator should ideally be a so-called "Janus" molecule, in the sense of having within it two parts that perform different functions.

It would also be desirable if this secondary accelerator could be selected from one class of chemical compounds and it would then be desirable that by varying the composition and chemical structure of the compounds belonging to this class it would be possible to modulate the vulcanization behaviour of the secondary accelerator.

It would moreover be desirable if the chemical compound to be used as secondary accelerator were a natural compound and if its derivatives could be obtained by reactions with harmless, non-toxic reagents, of natural origin, synthesized by simple reactions in simple plant with low operating costs.

It would finally be desirable if the elastomeric composition could be used for applications that require high dynamic mechanical properties, such as those required for compounds for tyres.

One aim of the present invention is therefore to provide a vulcanizable elastomeric composition that contains a chemical compound able to function as secondary accelerator in vulcanization processes, or that is able to accelerate the vulcanization reaction.

A further aim of the present invention is to obtain vulcanizable elastomeric compositions free from guanidine or derivatives thereof.

A further aim of the present invention is to obtain effective dispersion of silica in the vulcanizable elastomeric composition, reducing the viscous component of the compound and therefore its Payne effect.

Another aim of the present invention is to prepare a vulcanizable elastomeric composition in which the chemical compound used as secondary accelerator migrates with difficulty.

A further aim of the present invention is to clearly define a class of chemical compounds that may be used as secondary accelerators of a vulcanizable elastomeric composition, which can alter their behaviour and so can optimize the properties of the elastomeric composition for the applications, by modifying the chemical structure of the compounds belonging to the aforementioned class.

Another aim of the present invention is to identify natural chemical compounds that might function as secondary accelerators of a vulcanizable elastomeric composition.

A further aim of the present invention is to be able to obtain the chemical compounds that belong to the class of chemical compounds that can be used as secondary accelerators of vulcanizable elastomer compounds, by simple reactions that use reagents that are neither toxic nor harmful, and preferably are of natural origin.

A further aim of the present invention is to prepare elastomer compounds that might find applications that require good dynamic mechanical properties, such as those required for compounds for tyres. These and other aims of the present invention are achieved by a vulcanizable elastomeric composition comprising at least one diene elastomer, at least one reinforcing filler, at least one sulphur-based vulcanization system, and at least one compound of formula (I)

in which said compound of formula (I) is present in an amount from 0.3 phr to 20 phr, and in which X is selected from the group consisting of:

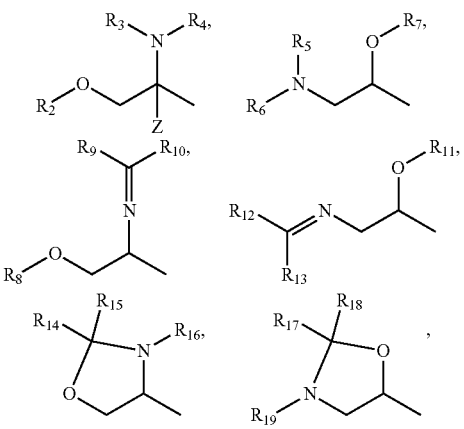

in which:

$R_1$, $R_2$, $R_7$, $R_8$, $R_{11}$, $R_{16}$ and $R_{19}$ are selected independently from the group consisting of: hydrogen, $C_1$-$C_{22}$ linear or branched alkyl, $C_2$-$C_{22}$ linear or branched alkenyl or alkynyl, aryl, $C_1$-$C_{22}$ linear or branched alkylaryl, $C_2$-$C_{22}$ linear or branched alkenyl-aryl, $C_2$-$C_{22}$ linear or branched alkynyl-aryl, $C_2$-$C_{22}$ linear or branched acyl-alkyl, $C_3$-$C_{22}$ linear or branched acyl-alkenyl or acyl-alkynyl, acyl-aryl, acyl-alkylaryl with $C_2$-$C_{22}$ linear or branched acyl-alkyl, acyl-alkenyl-aryl with $C_3$-$C_{22}$ linear or branched acyl-alkenyl, acyl-alkynyl-aryl with $C_3$-$C_{22}$ linear or branched acyl-alkynyl, heteroaryl;

at least one of $R_3$ and $R_4$ and at least one of $R_5$ and $R_6$ are hydrogen;

only one of $R_3$ and $R_4$ and only one of $R_5$ and $R_6$ can be acyl, acyl-aryl, acyl-alkylaryl with $C_2$-$C_{22}$ linear or branched acyl-alkyl, acyl-alkenyl-aryl with $C_3$-$C_{22}$ linear or branched acyl-alkenyl, acyl-alkynyl-aryl with $C_3$-$C_{22}$ linear or branched acyl-alkynyl;

Z is selected from the group consisting of: hydrogen, methyl, ethyl, hydroxymethyl;

$R_9$ and $R_{10}$ are selected independently from the group consisting of: hydrogen, a $C_2$-$C_{22}$ linear or branched alkenyl group, a $C_2$-$C_{22}$ linear or branched alkylidene group, an aryl group, an alkylaryl group with $C_1$-$C_{22}$ linear or branched alkyl, with the proviso that:

$R_9$ and $R_{10}$ are not simultaneously hydrogen;

or $R_9$ and $R_{10}$ may form a ring, which may contain from 3 to 20 atoms and one or two heteroatoms selected from O or N; with the proviso that:

when said ring comprises said heteroatoms the total number of ring atoms is 5 or 6;

when the ring contains 2 heteroatoms, they may be in position 1,2 or 1,3, considering as position 1 the position that is nearest to the carbon atom of the imine group;

or $R_9$ and $R_{10}$ may form polycycles formed by a number of carbon atoms that may range from 5 to 20, fused or spiro, with or without bridgehead atoms;

$R_{12}$ and $R_{13}$ are selected independently from the group consisting of: hydrogen, a $C_2$-$C_{22}$ linear or branched alkenyl group, a $C_2$-$C_{22}$ linear or branched alkylidene group, an aryl group, an alkylaryl group with $C_1$-$C_{22}$ linear or branched alkyl, with the proviso that:

$R_{12}$ and $R_{13}$ are not simultaneously hydrogen;

or $R_{12}$ and $R_{13}$ may form a ring, which may contain from 3 to 20 atoms and one or two heteroatoms selected from O or N; with the proviso that:

when said ring comprises said heteroatoms the total number of ring atoms is 5 or 6;

when the ring contains 2 heteroatoms, they may be in position 1,2 or 1,3, considering as position 1 the position that is nearest to the carbon atom of the imine group;

or $R_{12}$ and $R_{13}$ may form polycycles formed by a number of carbon atoms that may range from 5 to 20, fused or spiro, with or without bridgehead atoms;

$R_{14}$, $R_{15}$, $R_{17}$, and $R_{18}$ are selected independently from the group consisting of: hydrogen, $C_1$-$C_{22}$ linear or branched alkyl as long as not branched on $C_1$, $C_2$-$C_{22}$ linear or branched alkenyl or alkynyl, alkylaryl with alkyl that may be $C_1$-$C_{22}$ linear or branched with the aryl group not directly bound to the oxazolidine, alkenyl-aryl with $C_2$-$C_{22}$ linear or branched alkenyl and the aryl group not directly bound to the oxazolidine, alkynyl-aryl with $C_2$-$C_{22}$ linear or branched alkynyl and the aryl group not directly bound to the oxazolidine, $C_2$-$C_{22}$ linear or branched acyl-alkyl, $C_3$-$C_{22}$ linear or branched acyl-alkenyl or acyl-alkynyl;

or $R_{14}$, $R_{15}$, $R_{17}$, and $R_{18}$ form cycles of 5 and 6 carbon atoms.

Preferably the elastomeric composition according to the present invention comprises a compound of formula (I) in which $R_1$ is a hydrogen atom.

Preferably the elastomeric composition according to the present invention comprises a compound of formula (I) in which X is

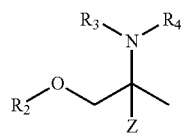

in which $R_2$ may be selected from the group consisting of: H, $CH_3$, $CH_2(CH_2)nCH_3$ with n between 0 and 16, preferably between 0 and 9;

$R_3$ and $R_4$ are hydrogen.

Z is selected from the group consisting of: hydrogen, methyl, ethyl, hydroxymethyl;

even more preferably $R_2$ is hydrogen, or X is

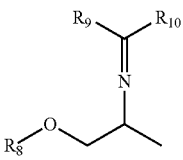

in which $R_9$ and $R_{10}$ form fused polycycles formed by a number of carbon atoms from 7 to 9 and in which $R_8$ is selected from the group consisting of: H, $CH_3$, $CH_2(CH_2)_nCH_3$ with n between 0 and 16, preferably between 0 and 9;

or in which $R_9$ is H, $R_{10}$ is CH or CH—$C_6H_5$ and $R_8$ is selected from the group consisting of: H, $CH_3$, $CH_2(CH_2)_n CH_3$ with n between 0 and 16, preferably between 0 and 9;

or X is

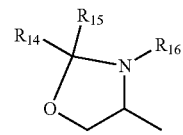

in which $R_{14}$ and $R_{15}$ may be the same or different from each other and are selected from the group consisting of: $CH_3$, $CH_2CH_3$, $CH_2CH_2CH_3$, $CH(CH_3)_2$, $CH_2CH(CH_3)_2$;

and in which $R_{16}$ is selected from the group consisting of: H, $CH_3$, $CH_2(CH_2)_nCH_3$ with n between 0 and 16, preferably between 0 and 9.

Diene elastomer means an elastomer that is derived from a monomer that contains two double bonds. In particular, the two double bonds in the monomer are conjugated. The polymer that will be formed by polymerization of a diene monomer that contains two conjugated double bonds, contains double bonds in the main polymer chain, where main polymer chain means the longest sequence of carbon atoms.

According to the IUPAC nomenclature, saturated or unsaturated aliphatic cyclic hydrocarbons consisting of only two rings that have two or more carbon atoms in common are defined as fused cyclic compounds. A carbon atom in common between the two rings constitutes a fusion point. Two fused rings have 2 carbon atoms in common (i.e. two fusion points), which may be joined together by one or more carbon atoms, which are called "bridgeheads". Aliphatic bicyclic compounds that have only one carbon atom in common are called "spiranes". The carbon that binds the two cycles is called "spiro atom".

A further aim of the present invention is to provide a secondary accelerator for vulcanization processes of elastomeric compositions comprising at least one diene elastomer, at least one reinforcing filler and at least one sulphur-based vulcanization system.

This aim is achieved using a compound of formula (I)

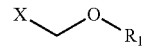

as accelerator for the vulcanization of elastomeric compositions in which X is selected from the group consisting of:

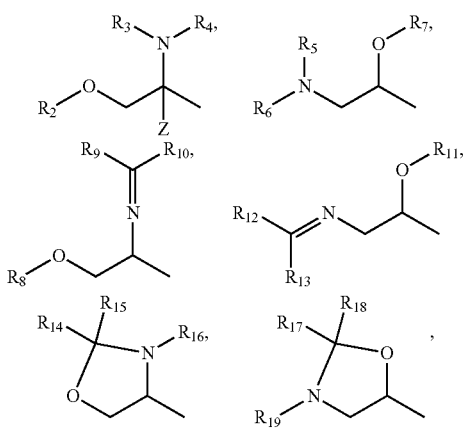

in which:

$R_1$, $R_2$, $R_7$, $R_8$, $R_{11}$, $R_{16}$ and $R_{19}$ are selected independently from the group consisting of: hydrogen, $C_1$-$C_{22}$ linear or branched alkyl, $C_2$-$C_{22}$ linear or branched alkenyl or alkynyl, aryl, $C_1$-$C_{22}$ linear or branched alkylaryl, $C_2$-$C_{22}$ linear or branched alkenyl-aryl, $C_2$-$C_{22}$ linear or branched alkynyl-aryl, $C_2$-$C_{22}$ linear or branched acyl-alkyl, $C_3$-$C_{22}$ linear or branched acyl-alkenyl or acyl-alkynyl, acyl-aryl, acyl-alkylaryl with $C_2$-$C_{22}$ linear or branched acyl-alkyl, acyl-alkenyl-aryl with $C_3$-$C_{22}$ linear or branched acyl-alkenyl, acyl-alkynyl-aryl with $C_3$-$C_{22}$ linear or branched acyl-alkynyl, heteroaryl;

at least one of $R_3$ and $R_4$ and at least one of $R_5$ and $R_6$ are hydrogen;

only one of $R_3$ and $R_4$ and only one of $R_5$ and $R_6$ may be acyl, acyl-aryl, acyl-alkylaryl with $C_2$-$C_{22}$ linear or branched acyl-alkyl, acyl-alkenyl-aryl with $C_3$-$C_{22}$ linear or branched acyl-alkenyl, acyl-alkynyl-aryl with $C_3$-$C_{22}$ linear or branched acyl-alkynyl;

Z is selected from the group consisting of: hydrogen, methyl, ethyl, hydroxymethyl;

$R_9$ and $R_{10}$ are selected independently from the group consisting of: hydrogen, a $C_2$-$C_{22}$ linear or branched alkenyl group, a $C_2$-$C_{22}$ linear or branched alkylidene group, an aryl group, an alkylaryl group with $C_1$-$C_{22}$ linear or branched alkyl, with the proviso that:

$R_9$ and $R_{10}$ are not simultaneously hydrogen;

or $R_9$ and $R_{10}$ may form a ring, which may contain from 3 to 20 atoms and one or two heteroatoms selected from O or N; with the proviso that:

when said ring comprises said heteroatoms the total number of ring atoms is 5 or 6;

when the ring contains 2 heteroatoms, they may be in position 1,2 or 1,3, considering as position 1 the position that is nearest to the carbon atom of the imine group;

or $R_9$ and $R_{10}$ may form polycycles formed by a number of carbon atoms that may range from 5 to 20, fused or spiro, with or without bridgehead atoms;

$R_{12}$ and $R_{13}$ are selected independently from the group consisting of: hydrogen, a $C_2$-$C_{22}$ linear or branched alkenyl group, a $C_2$-$C_{22}$ linear or branched alkylidene group, an aryl group, an alkylaryl group with $C_1$-$C_{22}$ linear or branched alkyl, with the proviso that:

$R_{12}$ and $R_{13}$ are not simultaneously hydrogen;

or $R_{12}$ and $R_{13}$ may form a ring, which may contain from 3 to 20 atoms and one or two heteroatoms selected from O or N; with the proviso that:

when said ring comprises said heteroatoms the total number of ring atoms is 5 or 6;

when the ring contains 2 heteroatoms, they may be in position 1,2 or 1,3, considering as position 1 the position that is nearest to the carbon atom of the imine group;

or $R_{12}$ and $R_{13}$ may form polycycles formed by a number of carbon atoms that may range from 5 to 20, fused or spiro, with or without bridgehead atoms;

$R_{14}$, $R_{15}$, $R_{17}$, and $R_{18}$ are selected independently from the group consisting of: hydrogen, $C_1$-$C_{22}$ linear or branched alkyl as long as not branched on $C_1$, $C_2$-$C_{22}$ linear or branched alkenyl or alkynyl, alkylaryl with alkyl that may be $C_1$-$C_{22}$ linear or branched with the aryl group not directly bound to the oxazolidine, alkenyl-aryl with $C_2$-$C_{22}$ linear or branched alkenyl and the aryl group not directly bound to the oxazolidine, alkynyl-aryl with $C_2$-$C_{22}$ linear or branched alkynyl and the aryl group not directly bound to the oxazolidine, $C_2$-$C_{22}$ linear or branched acyl-alkyl, $C_3$-$C_{22}$ linear or branched acyl-alkenyl or acyl-alkynyl;

or $R_{14}$, $R_{15}$, $R_{17}$, and $R_{18}$ form cycles of 5 and 6 carbon atoms.

Preferably $R_1$ is a hydrogen atom.
Preferably X is

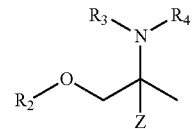

in which $R_2$ may be selected from the group consisting of: H, $CH_3$, $CH_2(CH_2)nCH_3$ with n between 0 and 16, preferably between 0 and 9; $R_3$ and $R_4$ are hydrogen.

Z is selected from the group consisting of: hydrogen, methyl, ethyl, hydroxymethyl;

even more preferably $R_2$ is hydrogen;
or X is

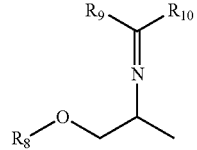

in which $R_9$ and $R_{10}$ form fused polycycles formed by a number of carbon atoms from 7 to 9 and in which $R_8$ is selected from the group consisting of: H, $CH_3$, $CH_2(CH_2)_nCH_3$ with n between 0 and 16, preferably between 0 and 9;

or in which $R_9$ is H, $R_{10}$ is CH or CH—$C_6H_5$ and $R_8$ is selected from the group consisting of: H, $CH_3$, $CH_2(CH_2)_nCH_3$ with n between 0 and 16, preferably between 0 and 9;

or X is

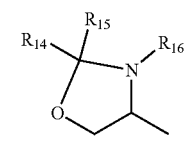

in which $R_{14}$ and $R_{15}$ may be the same or different from each other and are selected from the group consisting of: $CH_3$, $CH_2CH_3$, $CH_2CH_2CH_3$, $CH(CH_3)_2$, $CH_2CH(CH_3)_2$
and in which $R_{16}$ is selected from the group consisting of: H, $CH_3$, $CH_2(CH_2)_nCH_3$ with n between 0 and 16, preferably between 0 and 9.

A further aim of the present invention is to obtain a quick and effective vulcanization process, characterized by rapid vulcanization of the elastomeric composition, with a scorch time that is not short.

This aim is achieved by a process for vulcanizing elastomeric compositions, comprising the following steps:

mixing at least one diene elastomer, at least one vulcanization system containing sulphur, at least one reinforcing filler, at least one accelerator selected from the group consisting of thiazoles, sulphenamides, xanthogenates, in an amount between 0.1 and 10 phr, preferably in an amount between 0.5 and 5 phr and at least one accelerator of formula (I), in which said compound of formula (I) is present in an amount from 0.3 phr to 20 phr;

heating the mixture at a pressure from $5 \times 10^5$ to $20 \times 10^5$ Pa, preferably from $13 \times 10^5$ to $18 \times 10^5$ Pa, and at a temperature between 120 and 200° C., preferably between 140° C. and 180° C., for a time between 5 and 200 minutes, preferably between 10 and 40 minutes.

According to the present description the term "phr" indicates the parts by weight of a given component of the elastomeric composition per 100 parts by weight of the elastomer.

A further aim of the present invention is to provide a tyre for vehicle wheels comprising a vulcanizable elastomeric composition according to the present invention.

This aim is achieved by a tyre comprising at least one semi-finished product made with the vulcanizable elastomeric composition comprising a compound of formula (I) as described above.

Preferably, in the tyre according to the present invention the semi-finished product is a tyre tread.

Preferably, in the tyre according to the present invention the semi-finished product comprising the vulcanizable elastomeric composition comprises silica.

The term "primary accelerator" means a chemical compound that increases the rate of vulcanization of an elastomeric composition, so as to obtain a degree of crosslinking sufficient for the properties required for the crosslinked elastomeric composition, in an industrially acceptable time.

The term "secondary accelerator" means a chemical compound that greatly increases the rate of vulcanization of an elastomeric composition that already contains a "primary accelerator".

Preferably, the diene elastomer according to the present invention may be selected from those normally used in elastomeric compositions crosslinked with sulphur. This diene elastomer contains unsaturations in the polymer chain and has a glass transition temperature ($T_g$) generally below 20° C., preferably in the range between 0° C. and −90° C. This diene elastomer may be of natural origin or produced in a reactor for polymer synthesis, using technology that works in solution, or in emulsion or in the gas phase. The monomers that are polymerized are one or more conjugated diolefins, optionally mixed with at least one comonomer selected from monovinyl arenes and/or polar comonomers that have from 8 to 20 carbon atoms. The comonomer selected from monovinyl arenes and/or polar comonomers that have from 8 to 20 carbon atoms is preferably in an amount not greater than 60 wt %.

The conjugated diolefin has a number of carbon atoms between 4 and 12, preferably between 4 and 8 and may be selected, for example, from a group made up of: 1,3-butadiene, isoprene, 2,3-dimethyl-1,3-butadiene, 1,3-pentadiene, 1,3-hexadiene, 3-butyl-1,3-octadiene, 2-phenyl-1,3-butadiene, or mixtures thereof. 1,3-Butadiene and isoprene are particularly preferred.

The monovinyl arenes that may optionally be used as comonomers generally contain from 8 to 20, preferably from 8 to 12 carbon atoms and may be selected from: styrene, 1-vinylnaphthalene; 2-vinylnaphthalene; various alkyls, cycloalkyls, aryls, alkylaryls or aralkyl derivatives of styrene such as, for example, 1-methylstyrene, 3-methylstyrene, 4-propylstyrene, 4-cyclohexylstyrene, 4-dodecylstyrene, 2-ethyl-4-benzylstyrene, 4-p-tolylstyrene, 4-(4-phenylbutyl)styrene, or mixtures thereof. Among these, styrene is preferred.

The polar comonomers that may optionally be used are, for example, selected from: vinylpyridines, vinylquinoline, acrylic acid and esters of acrylic acid, nitriles or mixtures of these comonomers. Examples of acrylic esters are: methyl acrylate, ethyl acrylate, methyl methacrylate, ethyl methacrylate, acrylonitrile.

Preferably, the diene elastomer according to the present invention is selected from the group consisting of: poly(1,4-cis-isoprene), both natural rubber and synthetic polymer, poly(3,4-isoprene), poly(butadiene) (in particular poly(butadiene) with a high content of 1,4-cis units), optionally halogenated isoprene/isobutene copolymers, for example halogenated butyl rubber, in particular chlorobutyl and bromobutyl rubber, 1,3-butadiene/acrylonitrile copolymers, styrene/1,3-butadiene copolymers, styrene/isoprene/1,3-butadiene copolymers, styrene/1,3-butadiene/acrylonitrile copolymers or mixtures of these polymers.

The elastomeric composition according to the present invention may additionally contain at least one elastomer of one or more monoolefins. The monoolefins may be selected from: ethylene and 1-olefins that contain from 3 to 12 carbon atoms, such as, for example, propylene, 1-butene, 1-pentene, 1-hexene, 1-octene, or mixtures of these monoolefins. The elastomer of one or more monoolefins may contain a diene, which generally contains from 4 to 20 carbon atoms and is preferably selected from: 1,3-butadiene, isoprene, 1,4-hexadiene, 1,4-cyclohexadiene, 5-ethylidene-2-norbornene, 5-methylene-2-norbornene, vinylnorbornene or mixtures of these dienes. The diene may optionally be halogenated.

Among these elastomers of one or more monoolefins, the following are preferred: ethylene/propylene copolymers (EPR) or ethylene/propylene/diene (EPDM) copolymers, poly(isobutene).

The elastomeric composition may also contain a diene elastomer or an elastomer based on non-diene monomers, functionalized by reaction with a suitable terminating agent or coupling agents. In particular, the diene elastomeric polymer may be obtained by anionic polymerization promoted by an organometallic initiator (in particular an alkyl-lithium) and terminated by reaction with suitable terminating agents or coupling agents such as, for example, epoxides, carbonyl compounds, for example cyclohexanone and benzophenone, substituted or unsubstituted, imines, carbodiimides, alkyltin halides, alkoxysilanes or aryloxysilanes.

Preferably, the chemical compound of formula (I) according to the present invention may be added to the elastomeric composition as it is or supported on a support such as, for example, silica, alumina, carbon black or dispersed in a polymer matrix so that it can be obtained in subdivided form.

According to the present invention the accelerator may be supported on an inert support, employing the techniques normally used in the rubber sector.

For example, a suspension may be prepared containing the accelerator, the support and a solvent, which may then be removed by evaporation at reduced pressure. This methodology may be used in a laboratory. Or a more typically industrial methodology may be applied. The accelerator and the substance that acts as the support are fed into an extruder. Moreover, to promote homogeneous relative dispersion it is known to add a dispersant, typically an amorphous polymer, to the mixture.

The chemical compound of formula (I) may be commercially available, may be extracted from natural sources or may be synthesized autonomously. For example, 2-amino-1,3-propanediol may be purchased, or synthesized from glycerol, or may be obtained by fermentation from sugarcane.

Compounds according to formula (I) usable as accelerators in the elastomeric composition according to the invention are:

2-amino-1,3-propanediol, 3-amino-1,2-propanediol, Tris(hydroxymethyl)aminomethane, 2-amino-2-methyl-1,3-propanediol, 2-amino-2-ethyl-1,3-propanediol, and their amides of carboxylic acids.

N-(1,3-dihydroxypropyl)propionamide, N-(1,3-dihydroxypropyl)ethanamide, N-(1,3-dihydroxypropyl)butanamide, N-(1,3-dihydroxypropyl)pentanamide, N-(1,3-dihydroxypropyl)hexanamide, N-(1,3-dihydroxypropyl)heptanamide, N-(1,3-dihydroxypropyl)octanamide, N-(1,3-dihydroxypropyl)nonanamide, N-(1,3-dihydroxypropyl)decanamide, N-(1,3-dihydroxypropyl)undecanamide, N-(1,3-dihydroxypropyl)dodecanamide, N-(1,3-dihydroxypropyl)stearylamide, 1,3-dimethoxy-2-propanamine, 1,3-diethoxy-2-propanamine.

2-(1-phenyl-ethylidenamino)propane-1,3-diol, 2-(1-phenyl-propylidenamino)propane-1,3-diol, 2-(1,7,7-trimethyl-bicyclo[2.2.1]heptan-2-ylidenamino)propane-1,3-diol.

2-(3-(phenylallylidene)amino)propane-1,3-diol, (2,2-dimethyloxazolidin-4-yl)methanol, (2,2-diethyloxazolidin-4-yl)methanol, (2,2-methyl-ethyl-oxazolidin-4-yl)methanol, (2,2-methyl-propyloxazolidin-4-yl)methanol, (2,2-methyl-isopropyloxazolidin-4-yl)methanol, (2,2-methyl-butyloxazolidin-4-yl)methanol, (2,2-methyl-isobutyloxazolidin-4-yl)methanol, (2,2-dipropyloxazolidin-4-yl)methanol, (2,2-diisopropyloxazolidin-4-yl)methanol, (2-spirocyclohexyl-oxazolidin-4-yl)methanol, (2,2-dimethyloxazolidin-5-yl)methanol, (2,2-diethyloxazolidin-5-yl)methanol, (2,2-methyl-ethyl-oxazolidin-5-yl)methanol, (2,2-methyl-propyloxazolidin-5-yl)methanol, (2,2-methyl-isopropyloxazolidin-5-yl)methanol, (2,2-methyl-butyloxazolidin-5-yl)methanol, (2,2-methyl-isobutyloxazolidin-5-yl)methanol, (2,2-dipropyloxazolidin-5-yl)methanol, (2,2-diisopropyloxazolidin-5-yl)methanol, (2-spirocyclohexyl-oxazolidin-5-yl)methanol.

According to a preferred application, the chemical compound of formula (I) is preferably present in the elastomeric composition in an amount from 0.4 to 10 phr, more preferably from 0.5 phr to 5 phr.

The elastomeric composition according to the present invention is free from further secondary accelerators, different from the compound of formula (I), such as for example guanidines, thiurams, dithiocarbamates, thioureas, ammonium salts. In particular, the elastomeric composition is free from diphenylguanidine (DPG).

The elastomeric composition is vulcanizable with sulphur-based systems, commonly used for diene elastomers. For this purpose, a sulphur-based vulcanizing agent is incorporated in the elastomeric composition, together with the accelerators. The vulcanizing agent is added to the elastomeric composition following mastication of the elastomers and optional addition of reinforcing fillers (first mixing step). The vulcanizing agent is thus added in a second step or in a subsequent step (third step), after the other ingredients typical of an elastomeric composition have been added. Moreover, in the step in which the vulcanizing agent and the accelerators are added, the temperature is kept below 120° C., preferably below 100° C., in order to avoid undesirable phenomena of premature vulcanization. The secondary accelerator of the present invention may be added to the elastomeric composition in any of the steps mentioned, preferably in the second or third step.

The vulcanizing agent that may be used advantageously is sulphur or molecules that contain sulphur, usually called sulphur donors, together with accelerators and activators known by a person skilled in the art. Sulphur may be used in its orthorhombic crystalline form or as polymeric sulphur. Preferably, sulphur may be included in a range from 0.5 to 10 phr, preferably from 0.8 to 5 phr, more preferably from 1 phr to 3 phr. Preferably, the molecules containing sulphur may be included in the range from 0.5 to 10 phr, preferably from 0.8 to 5 phr, more preferably from 1 phr to 3 phr.

According to a preferred application, the elastomeric composition may comprise at least one primary accelerator. Examples of said primary accelerator are: thiazoles, for example 2-mercaptobenzothiazole (MBT), the zinc salt of 2-mercaptobenzothiazole (ZMBT), 2-mercaptobenzothiazole disulphide (MBTS), 2,4-dinitrophenylmercaptobenzothiazole; sulphenamides, for example N-cyclohexyl-2-benzothiazole sulphenamide (CBS), N, N'-dicyclohexyl-2-benzothiazole sulphenamide (DCBS), N-t-butyl-2-benzothiazylsulphenamide (TBBS), N-oxydiethylene-2-benzothiazylsulphenamide (OBS); xanthogenates, for example zinc isopropylxanthogenate (ZIX), zinc butylxanthogenate (ZBX), sodium isopropylxanthogenate (NaIX), dibutylxanthogenate disulphide (DBX); or mixtures thereof. The sulphenamides are preferably used, and more preferably N-cyclohexyl-2-benzothiazylsulphenamide (CBS) and N-t-butyl-2-benzothiazylsulphenamide (TBBS) are used.

Preferably, the primary accelerator is present in the elastomeric composition in an amount from 0.1 phr to 10 phr, preferably from 0.5 to 5 phr.

Moreover, the elastomeric composition according to the present invention may advantageously comprise a reinforcing filler. Said reinforcing filler may be selected from those commonly used for crosslinked elastomeric articles, for example carbon black, silica, alumina, the aluminosilicates, calcium carbonate, kaolin or mixtures of these fillers. Preferably said reinforcing filler is carbon black or silica.

The types of carbon black that may be used according to the present invention may be selected from those that have a surface area not less than 20 $m^2/g$, preferably not less than 40 $m^2/g$, determined by the nitrogen absorption method, called the BET method (Brunauer/Emmet/Teller), carried out using the method of ISO standard 5794/1. Another method for determining the surface area is the CTAB absorption method, as described in ISO standard 6810.

The silica used according to the present invention may be pyrogenic or, preferably, precipitated, with a BET surface area between 50 m²/g and 500 m²/g, preferably between 70 m²/g and 200 m²/g.

The reinforcing filler is present in the elastomeric composition according to the present invention in an amount between 0.1 phr and 200 phr, preferably between 10 phr and 170 phr.

The reinforcing filler may also be selected from the fillers normally defined as nanofillers, i.e. fillers that have at least one dimension under 100 nanometers. Examples of these nanofillers are the layered inorganic compounds. These layered inorganic compounds may be selected from the so-called cationic layered silicates, such as smectites. Examples of smectites are: montmorillonite, beidellite, hectorite, saponite, sauconite, vermiculite, halloysite, sericite and mixtures thereof. Montmorillonite is particularly preferred.

In order to make these cationic layered silicates compatible with the hydrophobic polymer matrix, usually the layered silicate is modified with an organophilic ammonium or phosphonium salt, which has the following structural formula:

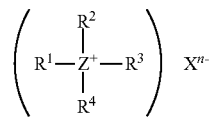

where:
Z is N or P
$R_1$, $R_2$, $R_3$ and $R_4$, which may be identical or different, are preferably $C_1$-$C_{22}$ alkyl, $C_2$-$C_{22}$ linear or branched alkenyl or alkynyl, aryl, $C_1$-$C_{22}$ alkylaryl, $C_2$-$C_{22}$ linear or branched alkenyl-aryl, $C_2$-$C_{22}$ alkynyl-aryl, heteroaryl;
$X^{n-}$ is an anion such as a chloride, a sulphate or a phosphate;
n is an integer equal to 1, 2 or 3.

The layered inorganic compounds may be selected from the so-called anionic inorganic compounds, such as the hydrotalcites.

In order to make these anionic layered inorganic compounds compatible with the hydrophobic polymer matrix, usually the layered silicate is modified with an organophilic anion selected for example from saturated and unsaturated fatty acids that contain from 8 to 18 carbon atoms, such as stearic acid, for example. The anionic layered silicate may also be modified with compounds such as a mono- or a di-diacid that contains sulphur atoms or sulphur-containing functional groups that are able to react during the vulcanization reaction. Examples of these compounds are: mercaptopropionic acid, mercaptoundecanoic acid, thiodipropionic acid.

Examples of nanofillers are also the carbon allotropes such as: fullerene, graphene, graphites with a number of stacked layers less than 300, preferably less than 100, preferably less than 10, or single-walled, double-walled and multi-walled carbon nanotubes.

When there is a silicate as reinforcing filler in the elastomeric composition and this silicate may be silica or a nanofiller such as a layered silicate, the elastomeric composition may advantageously incorporate a coupling agent, capable of binding the silica to the unsaturated elastomer, during the crosslinking reaction.

The coupling agents that are used conventionally are those based on silane, which may be identified by the following formula:

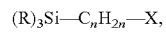

in which:
the groups R, which may be identical or different, may be selected from: the alkyl, alkoxy or aryloxy groups or from the halogen atoms, with the proviso that at least one group R is an alkoxy or an aryloxy.
n is an integer from 1 to 6 inclusive.
X is a group selected from: nitroso, mercapto, amino, epoxide, vinyl, imide, chloro, —$(S)_m C_n H_{2n}$—Si—$(R)_3$ in which m and n are integers from 1 to 6 inclusive and the groups R are defined as described above.

Among the coupling agents, bis(3-triethoxysilylpropyl) tertrasulphide and bis(3-triethoxysilylpropyl) disulphide are particularly preferred. These coupling agents may be used as such or mixed with a suitable inert filler (for example carbon black) in order to facilitate their incorporation in the elastomeric composition.

The elastomeric composition may also comprise activators. Activators that are particularly effective are zinc compounds, in particular ZnO, $ZnCO_3$, zinc salts of saturated and unsaturated fatty acids that contain from 8 to 18 carbon atoms, such as zinc stearate, for example. These fatty acids are preferably formed in situ in the elastomeric composition, starting from ZnO and fatty acids, for example stearic acid.

The elastomeric composition may further comprise other additives commonly used for giving the elastomeric composition the properties necessary for the specific applications for which the elastomeric composition is intended. For example, the following additives may be added: antioxidants, anti-ageing agents, plasticizers, adhesives, anti-ozone agents, resins for modifying the dynamic mechanical properties, fibres or mixtures of some or all of these ingredients.

In particular, for the purpose of improving processability, a plasticizer may be used that is selected from mineral oils, vegetable oils, synthetic oils or mixtures thereof. The amount of plasticizer may be from 2 phr to 100 phr, preferably from 5 phr to 50 phr.

The elastomeric composition according to the present invention may be prepared by mixing the components using the mixing techniques known in the prior art. For example, mixing may be carried out using an open mixer with rolls, also called calenders, or an internal mixer of the type with tangential rotors (Banbury) or with intermeshing rotors (Intermix). Or a corotating twin-screw extruder may be used. A static mixer may also be used. In the context of the process, a single-screw extruder or a counter-rotating twin-screw extruder may also be used.

The compound according to the present invention will be better illustrated by the examples given hereunder, which illustrate the operating steps of the process for preparing the compound of formula (I) and the vulcanization accelerator according to the present invention.

BRIEF DESCRIPTION OF THE DRAWINGS

Features and advantages will become clearer from the description of embodiments that are preferred, but not exclusive, according to the present invention, illustrated as examples in the appended drawings, in which.

The vulcanizable elastomeric composition according to the invention may be used advantageously in the production of tyres for vehicle wheels. For the purposes of the present invention, "tyre" means indifferently a finished tyre (i.e. a moulded and vulcanized tyre) or a green tyre (i.e. an assembly of semi-finished products in the green state, which at the end of the building step is ready for the step of moulding and vulcanization). In particular, the vulcanizable elastomeric composition according to the invention may be used for preparing one or more semi-finished products to be assembled into the green tyre, for example tyre tread, sidewalls, an optional cushion, chafer strips or elastomer fillers, carcass, belts etc. At the end of building, the green tyre comprising one or more semi-finished products predisposed using the elastomeric composition according to the invention is moulded and vulcanized to obtain a finished tyre.

In an especially preferred embodiment, the vulcanizable elastomeric composition according to the invention may be used for making the tyre tread, and in particular when the elastomeric composition comprises silica-based reinforcing filler.

Figure 7:
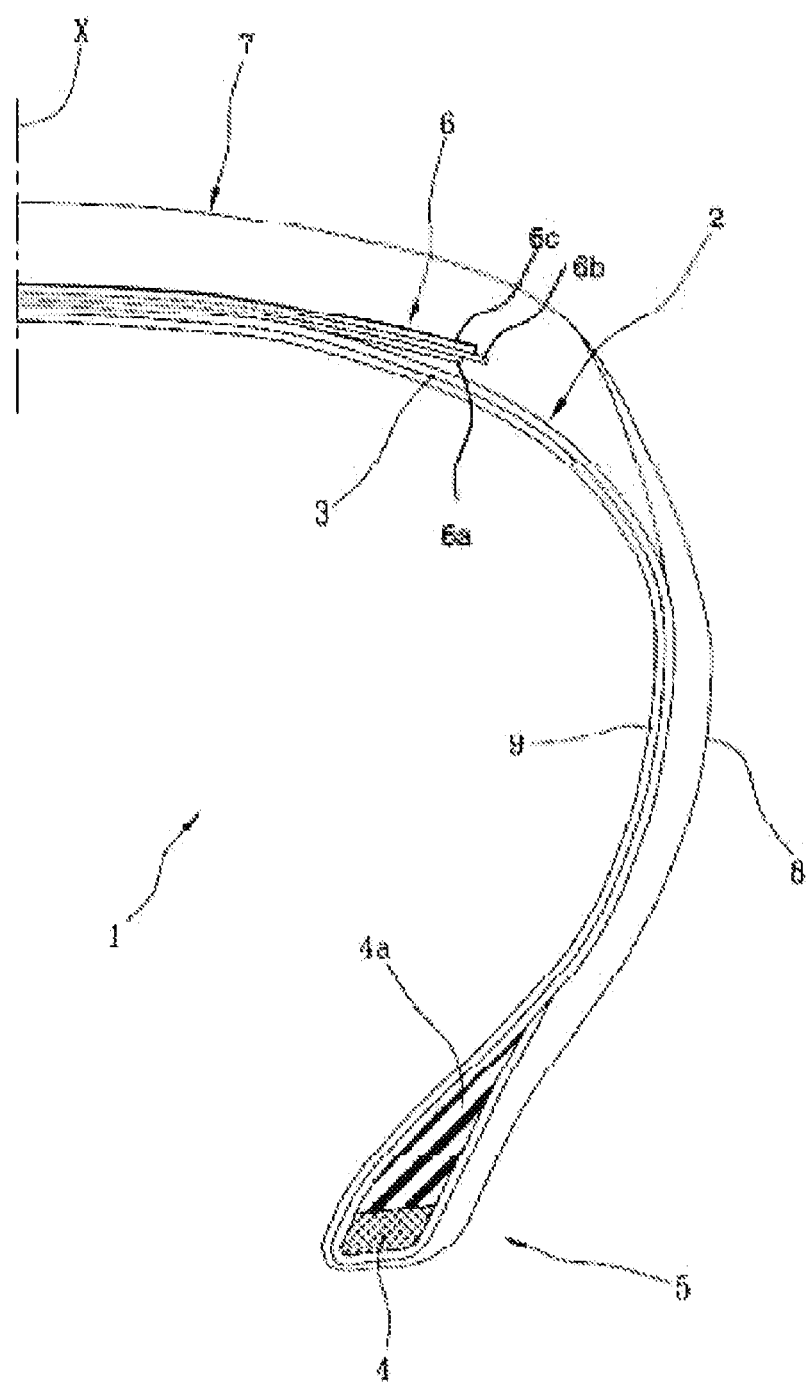
FIG. 7 shows schematically a part of a tyre for vehicle wheels.

Referring to FIG. 7, for simplicity only part of the tyre is shown, the remainder that is not shown being identical and arranged symmetrically with respect to the radial direction.

Reference 1 in FIG. 7 indicates a tyre for vehicle wheels, which generally comprises a carcass structure 2 comprising at least one carcass ply 3 having respectively opposite terminal edges engaged in respective annular anchoring structures 4, optionally together with elastomeric fillers 4a, integrated in zones 5, usually identified with the name "beads".

The carcass structure 2 has an associated belt structure 6 comprising one or more belt layers 6a, 6b arranged in radial superposition with respect to one another and relative to the carcass ply 3, having reinforcing cords, typically metallic. These reinforcing cords may have a crossed orientation relative to a circumferential direction of development of the tyre 1. "Circumferential" direction means a direction generally in the direction of rotation of the tyre, or else slightly inclined relative to the direction of rotation of the tyre.

A tyre tread 7 made of elastomer compound, like other semi-finished constituents of the tyre 1, is applied in a radially outer position to the belt structure 6.

On the lateral surfaces of the carcass structure 2, each extending from one of the lateral edges of the tyre tread 7 until flush with the respective annular structure for anchoring the beads 5, moreover, respective sidewalls 8 made of elastomer compound are applied in an axially outer position.

A radially inner surface of the tyre 1 is moreover preferably coated internally with a layer of elastomeric material that is substantially impermeable to air, the so-called liner 9.

The belt structure 6 further comprises at least one radially outer reinforcing layer 6c relative to the belt layers 6a, 6b.

The radially outer reinforcing layer 6c comprises textile or metal cords, arranged at a substantially zero angle relative to the direction of circumferential development of the tyre and embedded in the elastomeric material. Preferably, the cords are arranged substantially parallel and side by side so as to form a plurality of coils. These coils are substantially oriented in the circumferential direction (typically at an angle between 0° and 5°), this direction usually being called "zero degrees" with reference to its disposition relative to the equatorial plane X-X of the tyre. "Equatorial plane" of the tyre means a plane perpendicular to the rotation axis of the tyre, which divides the tyre into two symmetrically identical parts.

The building of tyre 1 as described above is carried out by assembling respective semi-finished products on a building drum, not shown, by means of at least one assembly device.

At least a part of the components intended to form the carcass structure 2 of tyre 1 is constructed and/or assembled on the building drum. More particularly, the building drum is suitable for receiving firstly the optional liner 9, and then the carcass ply 3. Next, devices that are not shown engage coaxially, around each of the terminal edges, one of the annular anchoring structures 4, position an outer sleeve comprising the belt structure 6 and the tyre tread 7 in a position coaxially centred around the cylindrical carcass sleeve and form the carcass sleeve according to a toroidal configuration by radially stretching the carcass ply 3, in order to ensure that it is applied against a radially inner surface of the outer sleeve.

Following building of the green tyre 1, a treatment of moulding and vulcanization is carried out, intended to provide structural stabilization of the tyre 1 by means of crosslinking of the elastomer compounds, as well as impressing a desired tread pattern on the tyre tread 7 and impressing optional distinctive graphical symbols on the sidewalls 8.

The tests carried out for the production, crosslinking and characterization of the elastomeric compositions will next be described.

Tests for production of the compounds.

Production of the Compounds in Table 1 and Table 6.

Production was carried out in an internal mixer of the Brabender® type with a mixing chamber having a volume equal to 50 mL. The degree of filling of the mixing chamber was kept at 80%. The rubbers were fed into the mixer and masticated at 90° C. for 1 minute with the rotors rotating at 30 rpm. The filler was then added together with the silane, stearic acid and oil, and the composite material was mixed for 4 minutes, discharging it at the end of this period at a temperature of 135° C. After 16 hours this composite material was fed into the internal mixer, and mixed at 60° C. for 1 minute with the rotors rotating at 30 rpm. Then ZnO and 6PPD were added, mixing for a further 2 minutes and discharging the composite material at 120° C. The final step was carried out by loading sulphur, and accelerators containing sulphur and free from sulphur into the internal mixer. The composite was discharged at 90° C. after mixing lasting 2 minutes. The composite was finally homogenized by mixing in the roll mixer, maintained at 50° C., with one roll rotating at 38 rpm, and the other roll rotating at 30 rpm, with a 1-cm gap between the rolls.

Production of the Compound in Table 9

Mixing was carried out in three steps using an internal mixer with tangential rotors (Pomini PL 1.6): the polymers, fillers, silane, stearic acid, wax, oil, resin and TMQ were introduced in the first step; after mixing for 4-5 minutes, on reaching a temperature of 135° C.±5° C., the composition was discharged.

After 12-24 hours, the second step was carried out, using the same mixer. ZnO, 6-PPD and the secondary accelerators according to the invention were introduced. Mixing was continued for about 3 minutes, until 125° C.±5° C. was reached, when the composition was discharged.

After 12-24 hours, in the third step, carried out using the same mixer, TBBS, DPG, PVI and sulphur were introduced. Mixing took about 2 minutes, until 95° C.±5° C. was reached, when the composition was discharged.

Production of the Compound in Table 14

Mixing was carried out in three steps using an internal mixer with tangential rotors (Pomini PL 1.6): the polymers, fillers, silane, stearic acid and wax were introduced in the first step; after mixing for 4-5 minutes, on reaching a temperature of 150° C.±5° C., the composition was discharged.

After 12-24 hours, in the second step, carried out using the same mixer, ZnO, TMQ, 6-PPD, DPG and the secondary accelerators according to the invention were introduced. Mixing was continued for about 3 minutes, until 125° C.±5° C. was reached, when the composition was discharged.

After 12-24 hours, in the third step, carried out using the same mixer, CBS, PVI and sulphur were introduced. Mixing took about 2 minutes, until 95° C.±5° C. was reached, when the composition was discharged.

Crosslinking Test

As described above, in order to allow the phenomenon of entropic elasticity to occur, an elastomer must be crosslinked, i.e. bonds must be introduced between the polymer chains. In most applications, these bonds are of a covalent nature. To form these bonds, at least one ingredient that is reactive with the polymer chains is added to the elastomeric composition. One example of an ingredient is peroxide, which reacts both with saturated and with unsaturated polymer chains. In most of the elastomer compounds, sulphur is added, together with a primary accelerator and activators. The crosslinking ingredient is mixed with the elastomeric matrix, typically filled with a reinforcing filler, at low temperature. The crosslinking reaction is then carried out at high temperature, typically between 150° C. and 180° C. When crosslinking is carried out with sulphur and sulphur-based ingredients, it is called vulcanization. During the test, the moment of a force is measured, necessary to allow a disk to rotate in the rubber, at a specified temperature, for an interval of time. This moment is called the torque. The torque values are stated as values of Modulus. During the test, keeping the sample in the instrument, there is a gradual increase in the modulus. A curve of the modulus as a function of time is obtained. The following parameters are obtained from the curve. $M_L$=minimum value of the modulus, which gives an indication of the viscosity of the compound, $M_H$=maximum value of the modulus, which indicates the maximum value of modulus reached by the vulcanization curve, $t_{s1}$=time taken for an increase in torque equal to 1 dNm, $t_{90}$=time to reach a value of the modulus equal to 90% of the maximum value of the modulus.

Crosslinking. Data given in Table 2 and Table 7.

Crosslinking was performed with a Monsanto RPA 2000 rheometer, at 170° C. for 20 minutes, at a frequency of 1.667 Hz and an angle of 6.98% (0.5 rad).

Crosslinking. Data given in Table 10 and Table 16

This was carried out according to standard ISO 6502, using an Alpha Technologies type MDR2000 rheometer. The tests were performed at 170° C. for 20 minutes at a frequency of oscillation of 1.66 Hz (100 oscillations per minute) and an oscillation amplitude of ±0.5°, measuring the time taken to reach an increase of two rheometric units (TS2) and the time taken to reach respectively 30% (T30) and 90% (T90) of the final torque value (Mf). The value of maximum torque MH and the value of minimum torque ML were also measured.

Scorch Time—Scorch Test

The scorch test is carried out to verify the tendency of an elastomer compound to crosslink at a temperature not far from that to which the elastomeric composition is exposed during the production process.

Scorch test presented in Table 3. The scorch test given in Table 3 was carried out with a Monsanto RPA 2000 rheometer. The samples of elastomeric composite material were put in the rheometer, conditioned at 130° C., and were subjected to a sinusoidal stress with a frequency of 0.5 Hz, keeping the amplitude of strain equal to 50%, for a duration of 60 minutes. The scorch test gives a curve that indicates the torque as a function of the test time. The torque and the time required for an increase in torque equal to 5 ($t_5$) dNm are measured. The curve thus gives: the value of ML, i.e. the minimum value of Modulus and the so-called scorch time, which corresponds to the time $t_5$. These values are shown in Table 3.

Scorch test presented in Table 15. The scorch test given in Table 15 was carried out at 130° C. according to standard ISO 289-2:1994.

Tensile Properties or Static Mechanical Properties

The static mechanical properties were measured at 23° C. according to standard ISO 37:2005. The following were measured in particular: the load at different levels of elongation (50%, 100% and 300%, denoted hereinafter $Ca_{05}$, $Ca_1$, $Ca_3$), the breaking load CR and the elongation at break AR on samples of the aforementioned elastomeric compositions, vulcanized at 170° C. for 10 minutes. The tensile tests were carried out on test specimens with a rectilinear axis of the Dumbbell type. The values obtained are given in Table 11 and Table 17.

Hardness Tests

The hardness in degrees IRHD was measured according to standard ISO 48:2007 at 23° C. and 70° C., on samples of the aforementioned elastomeric materials, vulcanized at 170° C. for 10 minutes. The values are given in Table 17.

Dynamic Mechanical Properties

By Shear Stress.

"Strain sweep test" means application of a dynamic stress by a shear stress, at constant frequency and at constant temperature, increasing the amplitude of the strain.

Strain Sweep Test. Data in Table 4 and Table 8

The test was carried out with a Monsanto RPA 2000 rheometer.

The samples of elastomeric composite material were held in the rheometer at 50° C. for 90 seconds, stress was then applied at 50° C. in the range of strain amplitude between 0.1% and 25%, with a frequency of 1 Hz, increasing the amplitude of the strain in the interval stated above. This treatment is carried out to cancel the "thermo-mechanical prior history". Vulcanization was then carried out at 170° C. for 20 minutes, at a frequency of 1.667 Hz and an angle of 6.98% (0.5 rad). The vulcanized sample was left in the instrument for 10 minutes at 50° C. The sinusoidal stress was then applied in the same conditions already stated, at 50° C. The sinusoidal stress is then applied again, still with the same experimental conditions. Curves are then obtained that give the value of the moduli as a function of the amplitude of the strain. These moduli are illustrated hereunder. Modulus G' is the elastic modulus, and modulus G" is the loss modulus. The ratio G"/G' is given as tan delta. The strain sweep test gives the values of the following parameters: $G'_{\gamma=0.28\%}$, which is the value of G' at minimum strain, ΔG', which is the difference between the value of G' at minimum strain and the value of G' measured at the maximum strain reached, $G''_{max}$, which is the maximum value of G" observed on the curve of G", (Tan Delta)$_{max}$, which is the maximum value of tan delta observed on the curve.

By Axial Stress. Data in Table 12 and Table 18

The dynamic mechanical properties through application of an axial stress were measured using an Instron dynamic tester in compression-tension mode by the following methods. A sample of the crude elastomeric compositions, vulcanized at 170° C. for 10 minutes, having a cylindrical shape (length=25 mm; diameter=14 mm), compression-pre-load up to 25% of the longitudinal strain relative to the initial length and maintained at the specified temperature (equal to −10° C., 0° C., +23° C. or +70° C.) throughout the test, was submitted to dynamic sinusoidal tension having an amplitude of ±3.5% relative to the length under pre-load, at a frequency of 10 Hz.

The dynamic mechanical properties are expressed in terms of values of dynamic elastic modulus (E') and of tan delta (dissipation factor). The value of tan delta was calculated as the ratio of the loss modulus (E") to the elastic modulus (E').

Extraction Test of the Secondary Accelerator from Silica.

The aim of this test is to verify the stability of the interaction between the secondary accelerator and silica. In fact, it was written in the text that one of the intrinsic technical problems of diphenyl guanidine is migration in the elastomer compound. This migration brings it into contact with neighbouring elastomer compounds, causing unwanted reaction with sulphur and the accelerators contained in the neighbouring compounds. In the case when the secondary accelerator displays greater interaction with silica, its migration in the elastomer compound should be reduced.

First Procedure:

A 50-mL one-necked flask equipped with a magnetic stirrer is loaded successively with 0.500 g of silica (Zeosil 1165 MP Rhodia) and 0.500 g of accelerator. The mixture is stirred for 2 hours at 120° C. At the end of this time, the mixture is cooled to room temperature and 10 mL of hexane is added. The suspension is stirred for 12 hours at room temperature. 2 mL of hexane is taken with a piston pipette and put in a 3-mL analysis vial. The liquid is injected into a gas chromatograph coupled to a mass spectrometer Agilent 5973Network Mass Selective Detector with 6890 Series GC System.

Second Procedure:

With DPG as accelerator, the extraction test was also carried out according to a second method, described hereunder. DPG is dissolved in an ethyl acetate/hexane mixture=1:1, then silica is added to the solution (the accelerator and the silica are in the same ratio as used in the first procedure). The solvent is then removed by evaporation at reduced pressure. The solid mixture is stirred for 2 hours at 120° C. The test then continues as in Procedure 1.

Materials

The chemical compounds used for synthesis of the molecules according to the present invention are given below, with the supplier indicated in parentheses. Acetone (Aldrich), ethyl acetate (Aldrich), hexane (Aldrich), camphor (Aldrich), cinnamaldehyde (Aldrich), 2-amino-1,3-propane-diol (serinol) (Bracco), isoserinol (Bracco), fluorenone (Aldrich), acetophenone (Aldrich), cyclohexanone (Aldrich), propanoyl chloride (Aldrich).

Tris(hydroxymethyl)aminomethane (indicated hereunder as TRIS AMINO) (CAS 77-86-1) (ANGUS);

2-amino-2-methylpropane-1,3-diol (indicated hereunder as AMPD) (CAS 115-69-5) (ANGUS).

The chemical compounds used for preparing the compounds, given in Table 1, Table 6, Table 9 and Table 14, are stated, with supplier, at the bottom of the Table.

EXAMPLES

Example 1

Synthesis of 4-hydroxymethyl-2,2-dimethyl-1,3-oxazolidine

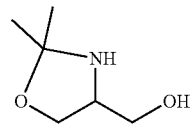

(2,2-dimethyloxazolidin-4-yl)methanol

A 50-mL one-necked flask was charged with 1 g of serinol (10.98 mmol), 10 mL of acetone and 1 g of Na$_2$SO$_4$. The reaction mixture was stirred overnight at room temperature. After filtration, the mixture was concentrated in a rotary evaporator. 1.302 g of a colourless oil was recovered. Yield=90%.

Characterization by H-NMR analysis gave the following results:

$^1$H-NMR (400 MHz, DMSO-d6): δ ppm 4.63 (br s, 1H, OH), 4.28 (br s, 1H, NH), 3.73-3.69 (t, 1H, CH—CH2-O), 3.48-3.45 (dd, 1H, CH2-OH), 3.39-3.35 (q, 1H, CH—CH2-O), 3.36-3.32 (dd, 1H, CH2-OH), 3.23-3.19 (m, 1H, CH2-CH—CH2), 1.27 (S, 3H, CH3), 1.16 (S, 3H, CH3).

Characterization by gas chromatography gave the following results:

GC-MS (solvent MeOH): 143 (M−2H+CH2), 128 (100), 116, 98, 83, 68, 55, 42.

GC-MS (solvent acetone): 132 (M+1), 116 (100), 100, 83, 74, 72, 68, 58, 43.

The $^1$H-NMR and $^{13}$C-NMR spectra were recorded using a Bruker 400 MHz instrument (100 MHz $^{13}$C) at 298 K. The chemical shifts are given in ppm, referring to the peak of the solvent (DMSO-d6: δ$_H$=2.50 ppm, CDCl$_3$: δ$_H$=7.26 ppm).

Example 2

Synthesis of (2,2-dimethyl-oxazolidin-5-yl)-methanol

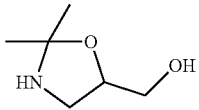

(2,2-Dimethyl-oxazolidin-5-yl)-methanol

A 50-mL one-necked flask was charged with 1 g of isoserinol (10.98 mmol), 10 mL of acetone and 1 g of Na$_2$SO$_4$. The reaction mixture was stirred overnight at room temperature. After filtration, the mixture was concentrated in a rotary evaporator. 1.302 g of a colourless oil was recovered. Yield=90%.

Example 3

Synthesis of 2-(1-phenyl-ethylidenamino)propane-1,3-diol

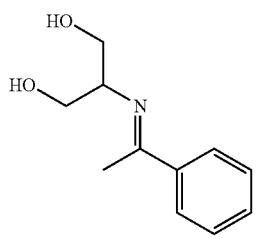

2-(1-phenyl-ethylidenamino)-propane-1,3-diol

A 20-mL open ampoule is charged with 1 g of serinol (10.98 mmol) and 1.31 g (10.98 mmol) of acetophenone. The mixture is heated at 130° C., stirring vigorously. Water is gradually removed from the mixture and over the course of an hour the mixture becomes homogeneous. The product is isolated by crystallization in diethyl ether.

Example 4

Synthesis of 2-(1,7,7-trimethylbicyclo[2.2.1]heptan-2-ylidenamino)propane-1,3-diol

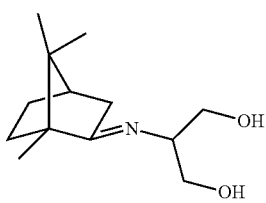 [SMILES: CC12CCC(C/C1=N/C(CO)CO)C2(C)C]

2-(1,7,7-trimethylbicyclo[2.2.1]heptan-2-ylidenamino)propane-1, 3-diol

A 20-mL open ampoule is charged with 0.910 g of serinol (9.98 mmol) and 2.0 g (13.14 mmol) of camphor. The mixture is heated at 170° C., vigorously stirring the two heterogeneous phases present. Water is gradually removed from the mixture and over the course of an hour the mixture becomes homogeneous. Periodically the camphor sublimed on the neck of the ampoule is melted and returned to the reaction mixture. After 4 hours the mixture is cooled, and is taken up 3 times in 5 mL of cold hexane, in which the excess camphor dissolves. The residue is taken up again in 5 mL of hexane, which is put under reflux, obtaining two phases: an oily phase of higher density and the hexane phase, which are separated by decanting. The oily residue is then taken up twice in hot hexane. White crystals precipitate in the cold from the hexane phases and are recrystallized from hexane (yield >70%).

Characterization by H-NMR analysis gave the following results:

$^1$H-NMR (400 MHz, DMSO-d6): δ ppm 4.26 (br s, 2H) 3.53-3.45 (m, 2H), 3.39-3.32 (m, 2H), 3.26-3.20 (m, 2H), 2.39-2.36 (d, 1H), 1.93-1.83 (m, 2H), 1.79-1.74 (t, 1H), 1.60-1.54 (t, 1H), 1.31-1.25 (t, 1H), 1.18-1.12 (t, 1H), 0.87 (s, 3H), 0.84 (s, 3H), 0.73 (s, 3H), $^{13}$C-NMR 180.5, 65.3, 62.96, 62.7, 53.0, 46.0, 43.2, 35.4, 31.9, 27.0, 19.3, 18.7, 11.5. ESI mass spectrum m/z (rel. int. %) (MeOH): 226 ([M+] 74%), 248 ([M+Na+], 100%); Mass-mass spectrum spedi 226: m/z (rel. int. %): 226 (28), 208 (90), 196 (16), 190 (11), 183 (34), 178 (20), 170 (25), 164 (72), 152 (100), 143 (74), 135 (48), 122 (18), 107 (82), 102 (17), 96 (28), 93 (60), 81 (22), 74 (28).

The $^1$H-NMR and $^{13}$C-NMR spectra were recorded using a Bruker 400 MHz (100 MHz $^{13}$C) at 298 K. The chemical shifts are given in ppm, referring to the peak of the solvent (DMSO-d6: δ$_H$=2.50 ppm, CDCl$_3$: δ$_H$=7.26 ppm).

Example 5

Synthesis of 2-(3-(phenylallylidene)amino)propane-1,3-diol

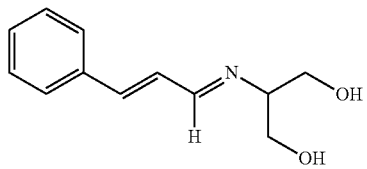 [SMILES: OCC(CO)/N=C/C=C/c1ccccc1]

2-(3-(phenylallylidene)amino)propane-1,3-diol

A 100-mL one-necked flask equipped with a magnetic stirrer is charged with 6.61 g (50 mmol) of cinnamaldehyde and 4.55 g (50 mmol) of serinol. The mixture is stirred for 2 hours at 100° C. At the end of this time, the temperature is brought to 25° C. The pure product was obtained by filtering the yellow crystals with water and removing the traces of solvent at reduced pressure. 9.42 g of white crystals were obtained.

Example 6

Synthesis of 2-(fluoren-9-ylidenamino)propane-1,3-diol

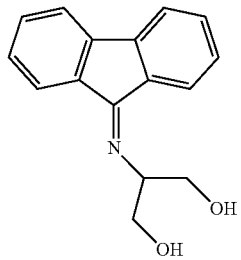 [SMILES: OCC(CO)N=C1c2ccccc2-c2ccccc21]

2-(Fluoren-9-ylidenamino) propane-1,3-diol

A 50-mL one-necked flask equipped with a magnetic stirrer is charged with 0.910 g (9.98 mmol) of serinol and 1.8 g (9.98 mmol) of 9-fluorenone. The mixture is heated at 130° C.: after about 30 minutes a homogeneous mixture is obtained. It is left to react for 6 hours, and then is cooled. 20 mL of toluene is added to the mixture and it is refluxed, stirring for 5 minutes, and then the stirrer is stopped. A two-phase mixture is thus obtained, consisting of the toluene solution and a small amount of red oil of higher density. The toluene solution is separated hot by decanting: a yellow solid precipitates from it, and is filtered, washed with toluene, and recrystallized from toluene. Yield of crystallized product >80%.

Characterization by H-NMR analysis gave the following results:

$^1$H-NMR (400 MHz, DMSO-d6): δ 8.13-8.11 (d, 1H, Ar—CH), 7.87-7.86 (d, 1H, Ar—CH), 7.79-7.77 (d, 1H, Ar—CH), 7.71-7.70 (d, 1H, Ar—CH), 7.53-7.44 (2t, 2H, Ar—CH), 7.38-7.30 (2t, 2H, Ar—CH), 4.70-4.64 (m, 3H, (1H of CH2-CH—CH2 and 2H—OH), 3.82-3.78 to 3.63-3.58 (two dd, 4H, (CH2-CH—CH2). $^{13}$C-NMR 162.4, 143.3, 140.7, 138.5, 131.8, 128.7, 128.2, 122.8, 121.0, 120.1, 66.0, 63.5. ESI mass spectrum, m/z (rel. int. %) (MeOH): 277 ([M+Na+], 97%), 254 ([M++H], 100%); mass-mass spectrum of 254: m/z (rel. int. %): 254 (35), 236 (58), 206 (13), 192 (100), 180 (77), 165 (47).

The $^1$H-NMR and $^{13}$C-NMR spectra were recorded using a Bruker 400 MHz (100 MHz $^{13}$C) at 298 K. The chemical shifts are given in ppm, referring to the peak of the solvent (DMSO-d6: $δ_H$=2.50 ppm, CDCl$_3$: $δ_H$=7.26 ppm).

Example 7

Synthesis of N-(1,3-dihydroxypropyl)-propionamide

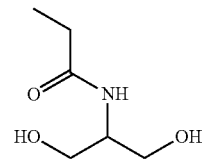

N-(1,3-dihydroxypropyl)-propionamide

A 100-mL one-necked flask equipped with a magnetic stirrer is charged with 0.500 g (5.5 mmol) of serinol and 0.100 g (1.1 mmol) of acryloyl chloride at 0° C. The mixture is stirred at this temperature for 30 min. At the end of this time, 10 mL of CH$_2$Cl$_2$ and then 10 mL of water are added. The organic phase is dried over Na$_2$SO$_4$, filtered and dried at reduced pressure. 0.270 g of product was obtained.

Examples 8, 9, 10, 11, 12, 13, 14, 15

Preparation of Elastomer Compounds

The formulations of the elastomer compounds are given in Table 1.

TABLE 1

| | Formulations for elastomeric compositions | | | | | | | |
|---|---|---|---|---|---|---|---|---|
| Ingredient | Ex. 8 | Ex. 9 | Ex. 10 | Ex. 11 | Ex. 12 | Ex. 13 | Ex. 14 | Ex. 15 |
| | Phr | | | | | | | |
| NR[a] | 15.00 | 15.00 | 15.00 | 15.00 | 15.00 | 15.00 | 15.00 | 15.00 |
| S-SBR[b] | 96.25 | 96.25 | 96.25 | 96.25 | 96.25 | 96.25 | 96.25 | 96.25 |
| BR[c] | 15.00 | 15.00 | 15.00 | 15.00 | 15.00 | 15.00 | 15.00 | 15.00 |
| Silane Si 69[d] | 5.20 | 5.20 | 5.20 | 5.20 | 5.20 | 5.20 | 5.20 | 5.20 |
| Silica[e] | 65.00 | 65.00 | 65.00 | 65.00 | 65.00 | 65.00 | 65.00 | 65.00 |
| MES oil[f] | 10.00 | 10.00 | 10.00 | 10.00 | 10.00 | 10.00 | 10.00 | 10.00 |
| Stearic acid[g] | 2.00 | 2.00 | 2.00 | 2.00 | 2.00 | 2.00 | 2.00 | 2.00 |
| Zinc oxide[h] | 2.50 | 2.50 | 2.50 | 2.50 | 2.50 | 2.50 | 2.50 | 2.50 |
| 6PPD[i] | 2.00 | 2.00 | 2.00 | 2.00 | 2.00 | 2.00 | 2.00 | 2.00 |
| TBBS[k] | 1.80 | 1.80 | 1.80 | 1.80 | 1.80 | 1.80 | 1.80 | 1.80 |
| Sulphur[l] | 1.20 | 1.20 | 1.20 | 1.20 | 1.20 | 1.20 | 1.20 | 1.20 |
| DPG80[m] | 0.00 | 2.40 | 0.00 | 0.00 | 0.00 | 0.00 | 0.00 | 0.00 |
| Serinol[n] | 0.00 | 0.00 | 0.83 | 0.00 | 0.00 | 0.00 | 0.00 | 0.00 |
| camphor imine | 0.00 | 0.00 | 0.00 | 2.04 | 0.00 | 0.00 | 0.00 | 0.00 |

TABLE 1-continued

Formulations for elastomeric compositions

| Ingredient | Ex. 8 | Ex. 9 | Ex. 10 | Ex. 11 | Ex. 12 | Ex. 13 | Ex. 14 | Ex. 15 |
|---|---|---|---|---|---|---|---|---|
| | | | | Phr | | | | |
| (Ex. 4) cinnamaldehyde imine (Ex. 5) | 0.00 | 0.00 | 0.00 | 0.00 | 1.87 | 0.00 | 0.00 | 0.00 |
| serinol oxazolidine (Ex. 1) | 0.00 | 0.00 | 0.00 | 0.00 | 0.00 | 1.19 | 0.00 | 0.00 |
| isoserinol oxazolidine (Ex. 2) | 0.00 | 0.00 | 0.00 | 0.00 | 0.00 | 0.00 | 1.19 | 0.00 |
| serinol amide (Ex. 7) | 0.00 | 0.00 | 0.00 | 0.00 | 0.00 | 0.00 | 0.00 | 1.34 |

[a] natural poly(1,4-cis-isoprene) (NR) commercial grade SMR GP (from Lee Rubber)
[b] Styrene-butadiene rubber from solution; commercial grade Styron 4630 (from Styron), 25% as styrene content
[c] Polybutadiene; commercial grade Europrene neocis (from Polimeri Europa)
[d] bis[3-(triethoxysilyl)propyl]tetrasulphide from Evonik
[e] ZEOSIL 1165MP (supplier SOLVAY RHODIA OPERATIONS)
[f] Aliphatic oil, from Eni
[g] Stearin N, from SOGIS
[h] from Zincol Ossidi
[i] N-(1,3-dimethylbutyl)-N'-phenyl-p-phenylenediamine, from Crompton.
[k] N-tert-butyl-2-benzothiazyl sulphenamide (TBBS), from Flexsys
[l] from Solfotecnica
[m] Diphenylguanidine (Rhenogran ® DPG80), from Rhein Chemie Additives
[n] 2-amino-1,3-propanediol, from Bracco

Example 8 (Comparative)

Preparation of Elastomer Compound (Comparative Example without Secondary Accelerator)

3.50 g of NR, 22.48 g of S-SBR and 3.50 g of BR were put in an internal mixer of the Brabender® type having a mixing chamber with a volume equal to 50 cc, and mastication was carried out at 145° C. for 1 minute. Then 15.18 g of Zeosil 1165 silica, 1.21 g of TESPT silane, 0.47 g of stearic acid, and 2.34 g of MES oil were added, mixing for a further 5 minutes and discharging the composite obtained at 150° C. The composite thus prepared was then put in the internal mixer at 50° C., adding 0.58 g of ZnO, 0.47 g of 6PPD, and mixing for 2 minutes. Then 0.28 g of sulphur and 0.42 g of N-tert-butyl-2-benzothiazyl sulphenamide (TBBS) were added, mixing for a further 2 minutes. The composite was discharged at 65° C.

Example 9 (Comparative)

The compound was prepared as in example 9, except that 0.56 g of supported diphenyl guanidine (which corresponds to 0.45 g of pure DPG) was introduced in Step 0.0.

Example 10 (Invention)

Preparation of Elastomer Compound (with Serinol)

The compound was prepared as in example 9, except that 0.195 g of serinol was supplied instead of 0.56 g of DPG. The molar amount of serinol is equal to the molar amount of pure DPG.

Example 11 (Invention)

Preparation of Elastomer Compound (with Camphor Imine)

The compound was prepared as in example 9, except that 0.48 g of camphor imine was supplied instead of 0.56 g of DPG. The molar amount of camphor imine is equal to the molar amount of DPG.

Example 12 (Invention)

Preparation of Elastomer Compound (with Cinnamaldehyde Imine)

The compound was prepared as in example 9, except that 0.44 g of cinnamaldehyde imine was supplied instead of 0.56 g of DPG. The molar amount of cinnamaldehyde imine is equal to the molar amount of pure DPG.

Example 13 (Invention)

Preparation of Elastomer Compound (with Oxazolidine from Serinol and Acetone)

The compound was prepared as in example 9, except that 0.28 g of oxazolidine from serinol and acetone was supplied instead of 0.56 g of DPG. The molar amount of oxazolidine from serinol and acetone is equal to the molar amount of pure DPG.

Example 14 (Invention)

Preparation of Elastomer Compound (with Oxazolidine from Isoserinol and Acetone)

The compound was prepared as in example 9, except that 0.28 g of oxazolidine from isoserinol and acetone was supplied instead of 0.56 g of DPG. The molar amount of oxazolidine from isoserinol and acetone is equal to the molar amount of pure DPG.

Example 15 (Invention)

Preparation of Elastomer Compound (with Amide from Serinol and Chloride of Propionic Acid)

The compound was prepared as in example 9, except that 0.31 g of amide from serinol and chloride of propionic acid was supplied instead of 0.56 g of DPG. The molar amount of amide from serinol and chloride of propionic acid is equal to the molar amount of pure DPG.

Vulcanization of the Compounds in Examples 8, 9, 10, 11, 12, 13, 14, 15

The composites in examples 8-15 were vulcanized at 170° C. and at a pressure of $15 \times 10^5$ Pa for 20 minutes, according to the operating procedure described above.

Table 2 gives the data relating to the vulcanization reactions.

Figure 1:
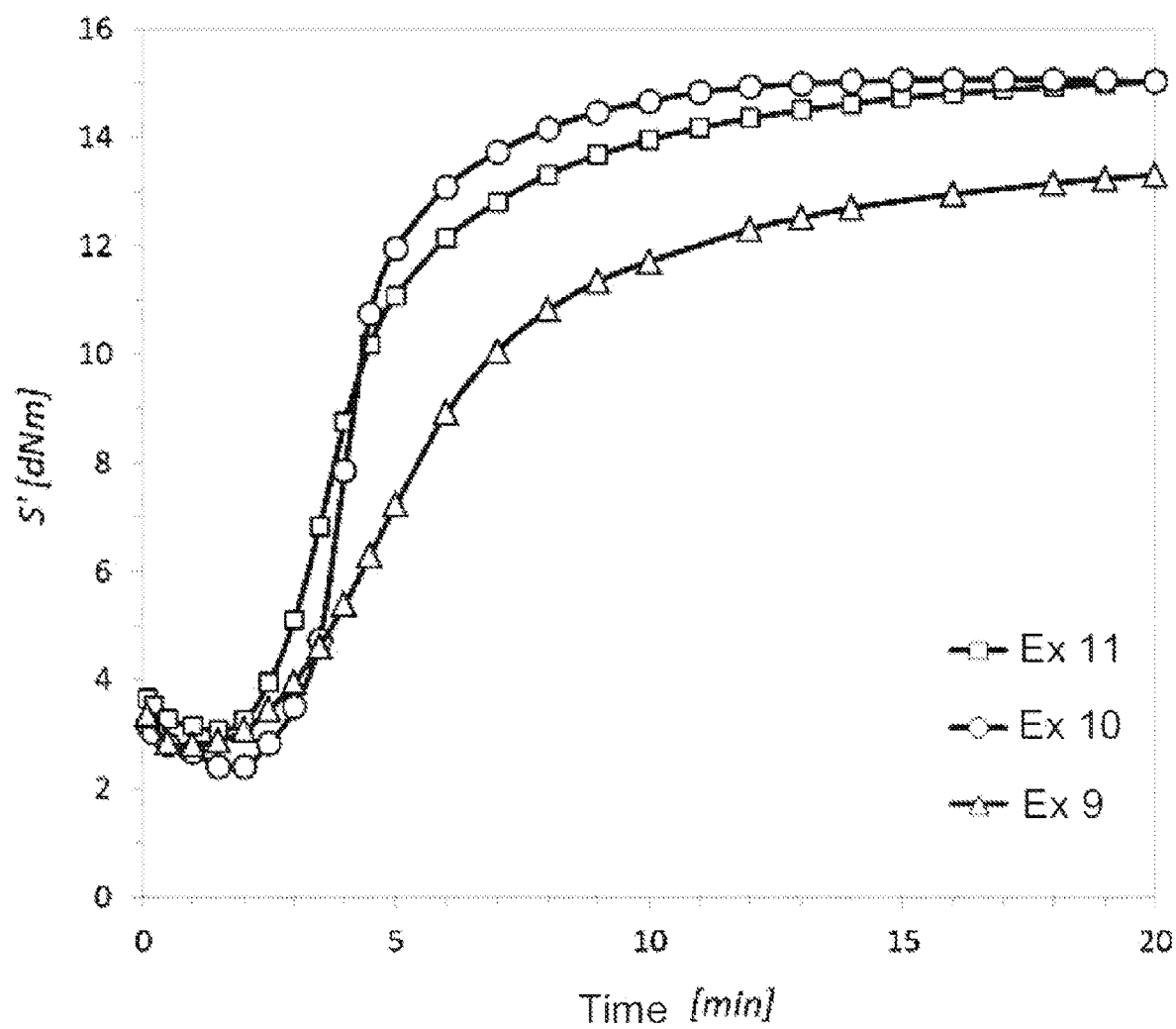
FIG. 1 shows the vulcanization curve for the elastomeric compositions from Examples 8, 9, 10 in Table 1.

FIG. 1 gives the vulcanization curves of the elastomeric compositions in Examples 8, 9 and 10.

Figure 2:
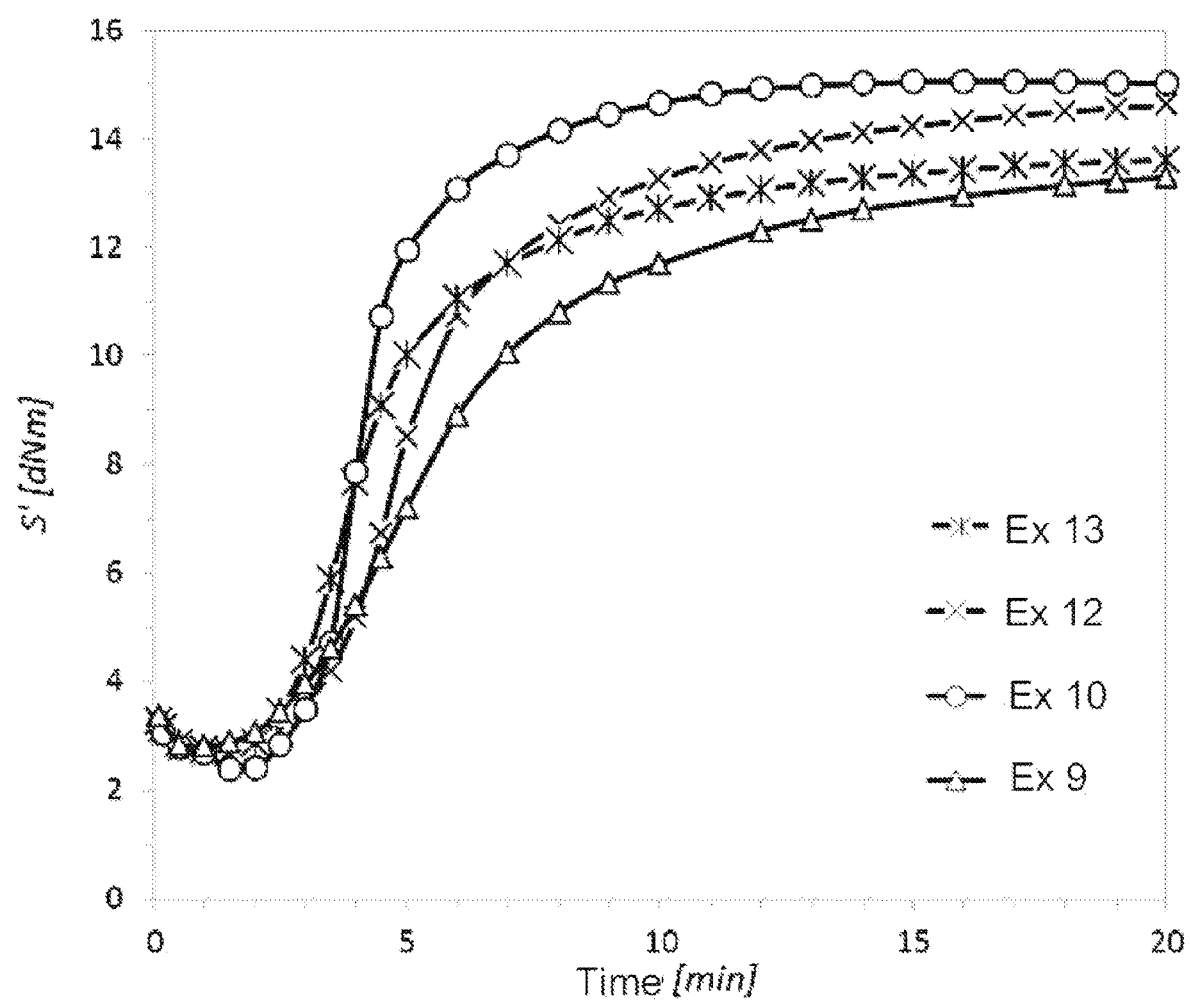
FIG. 2 shows the vulcanization curve for the elastomeric compositions from examples 8, 9, 11, 12 in Table 1.

FIG. 2 gives the vulcanization curves of the elastomeric compositions in Example 8, Example 9, Example 11, and Example 12.

Figure 3:
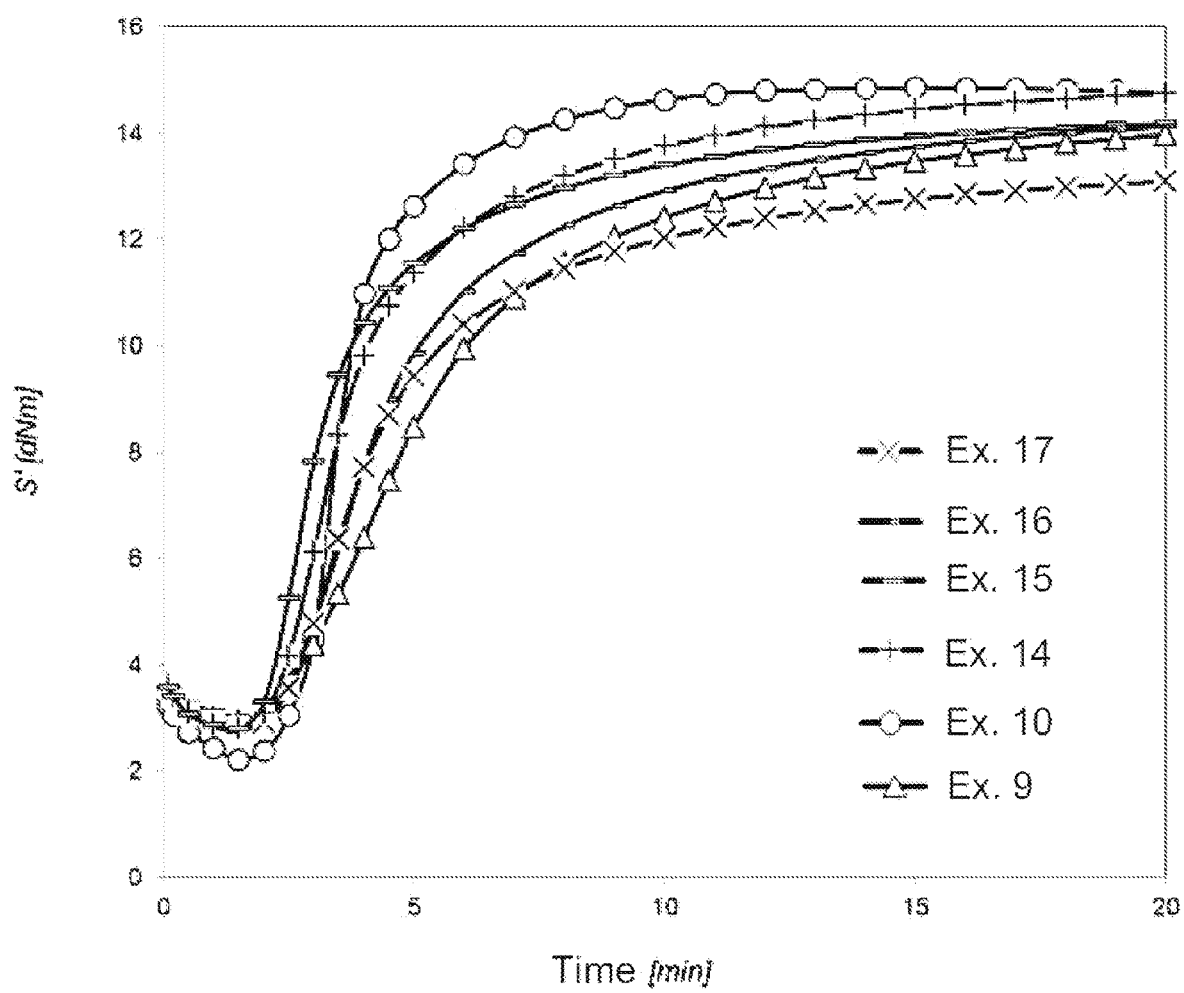
FIG. 3 shows the vulcanization curve for the elastomeric compositions from examples 8, 9, 13, 14, 15 in Table 1.

FIG. 3 gives the vulcanization curves of the elastomeric compositions in Example 8, Example 9, Example 13, Example 14, and Example 15.

TABLE 2

Values of $M_L$, $M_H$, $t_{s1}$, $t_{90}$ determined in the rheometric test for the elastomeric compositions in Table 1[a]

| Ex. prep. compound | Ex. 8 | Ex. 9 | Ex. 10 | Ex. 11 | Ex. 12 | Ex. 13 | Ex. 14 | Ex. 15 |
|---|---|---|---|---|---|---|---|---|
| $M_L$ [dNm] | 2.8 | 2.3 | 3.1 | 2.61 | 2.68 | 2.81 | 2.78 | 2.97 |
| $M_H$ [dNm] | 13.3 | 15.1 | 15.0 | 14.62 | 13.62 | 14.75 | 14.19 | 14.14 |
| $t_{s1}$ [min] | 2.84 | 2.9 | 2.6 | 3.03 | 2.65 | 2.38 | 2.17 | 2.63 |
| $t_{90}$ [min] | 11.52 | 7.14 | 9.53 | 10.51 | 9.2 | 9.17 | 8.32 | 10.42 |

[a] $M_L$ minimum value of torque, measured in dNewton x meter (dNm). $M_H$ maximum value of torque, measured in dNm. $t_{s1}$: time required for an increase of 1 dNm in the torque value, relative to the minimum value $M_L$. $t_{90}$: time taken to reach 90% of the torque value, relative to the maximum value $M_H$.

The data in Table 2 show that the secondary accelerators according to the present invention produce an advantage relative to the compound that does not contain a secondary accelerator. In fact, the induction time to vulcanization ($t_{s1}$) is less than or in line with the vulcanization time of the compound in the absence of secondary accelerator. In particular, the time taken to reach optimum vulcanization ($t_{90}$) is less. The values of $M_L$ are in line or lower, indicating that the viscosity of the compound does not change substantially as a result of adding the secondary accelerators according to the present invention. The values of $M_H$ are higher for the compounds that contain both serinol, and the imines of serinol, and the oxazolidine and the amide of serinol. The data relating to the compounds that contain the secondary accelerators according to the present invention seem to be in line with those of the compound that contains DPG, apart from the values of $t_{90}$. In fact, the value of $t_{90}$ is lower in the case of the compound with DPG. It should, however, be noted that the accelerators according to the present invention offer the possibility of modulating the values of the vulcanization parameters by changing the substituents of the compound of formula (I).

Determination of the Scorch Time of the Compounds in Examples 8, 9, 10, 11, 12, 13, 14, 15

The scorch time of the composites in examples 8-15 was determined by rheometric measurements carried out at 130° C. according to the operating procedure described above.

Table 3 shows the time taken for the elastomeric compositions prepared in examples 8-15 to reach an increase in the torque value equal to 5 dNm, i.e. the scorch time.

TABLE 3

Values of $M_L$ and of scorch time $t_{s5}$ scorch time ($t_{s5}$) determined by the scorch test for the elastomeric compositions in Table 1[a]

| Ex. prep. compound | | Ex. 8 | Ex. 9 | Ex. 10 | Ex. 11 | Ex. 12 | Ex. 13 | Ex. 14 | Ex. 15 |
|---|---|---|---|---|---|---|---|---|---|
| $M_L$ | dNm | 7.07 | 6.09 | 6.96 | 6.51 | 6.13 | 6.64 | 6.67 | 6.94 |
| Scorch time | min | 46.36 | 28.94 | 25.66 | 37.31 | 27.02 | 20.55 | 14.27 | 29.13 |

[a] $M_L$: minimum value of Modulus; Scorch time = $t_{s5}$ = time taken for an increase in torque equal to 5 dNm.

The values of scorch time given in Table 3 for the compounds that contain the secondary accelerator according to the present invention are all lower than for the compound without secondary accelerator. It should be noted, however, that the measured values are acceptable for conditions of normal use in industrial practice. However, the value of the scorch time for the compound that contains serinol camphor seems interesting; it is significantly higher than the values for the other compounds. Serinol camphor thus appears to be a secondary accelerator that gives vulcanizations in line with those obtained with DPG and at the same time absolutely does not present the technical problem of premature vulcanization during processing of the compound. The oxazolidine of isoserinol seems particularly reactive. This means it is possible to use a smaller amount of secondary accelerator, which would lead to an increase in scorch time, while using less accelerator. The values of scorch time for the compounds that contain the secondary accelerator according to the present invention are in line with the value measured for the compound that contains DPG.

The scorch times and the vulcanization induction times (ts1) show a linear correlation.

Dynamic-Mechanical Characterization of the Compounds in Examples 8, 9, 10, 11, 12, 13, 14, 15

The composites in examples 8-15 were characterized by applying sinusoidal stressing by a shear stress, according to the operating procedure described above.

Table 4 shows the data relating to the dynamic modulus G' at minimum strain, with variation Δ of the modulus G', (ΔG'), between 0.28% and 25% as amplitude of the strain, at the maximum value of the dissipative modulus G", at the maximum value of tan delta.

Figure 4:
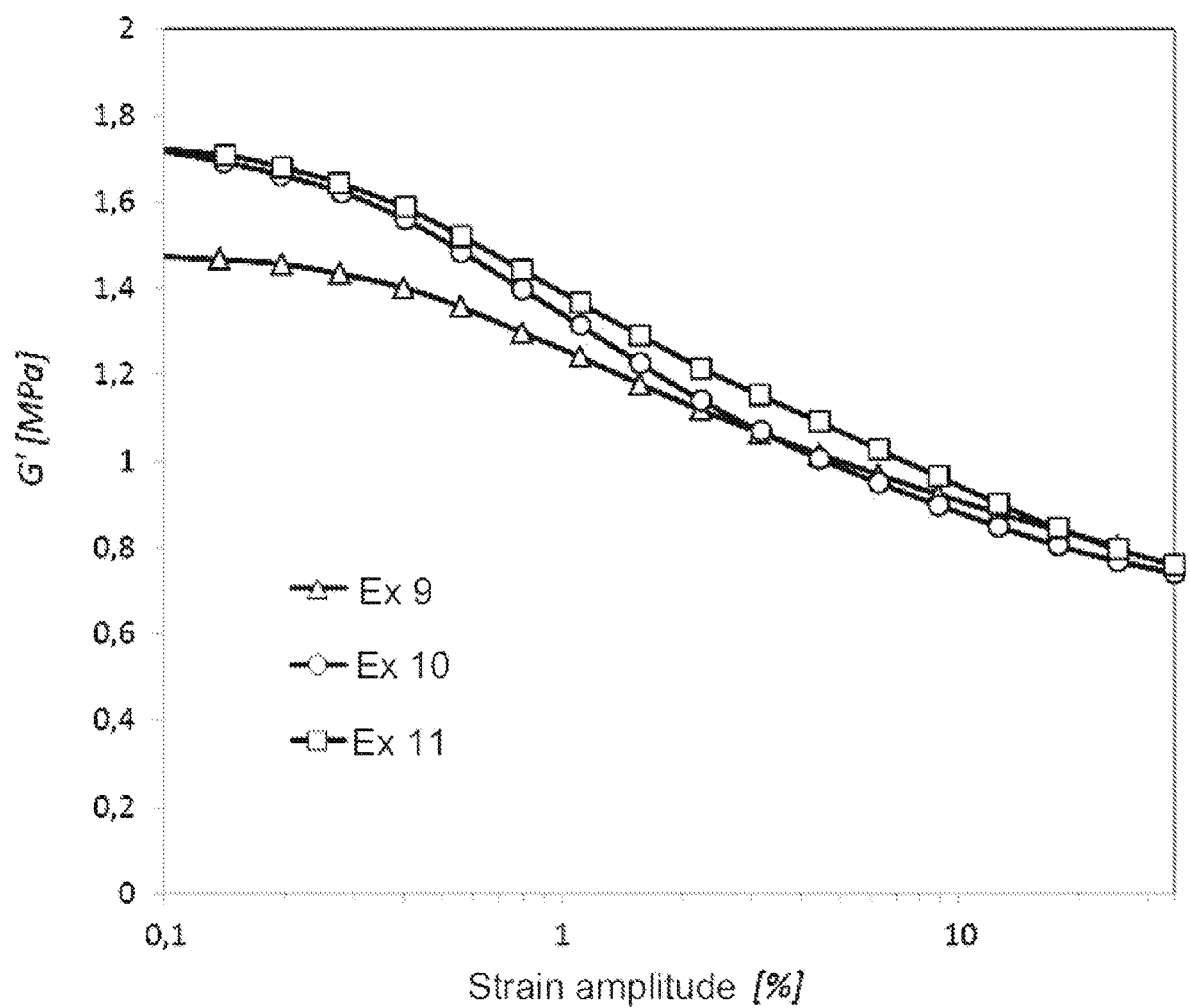
FIG. 4 shows the dynamic modulus G' as a function of the amplitude of the strain for the elastomeric compositions from examples 8, 9, 10 in Table 1.

FIG. 4 shows the conservative dynamic modulus G' as a function of the amplitude of the strain for the elastomeric compositions in Examples 8, 9 and 10.

Figure 5:
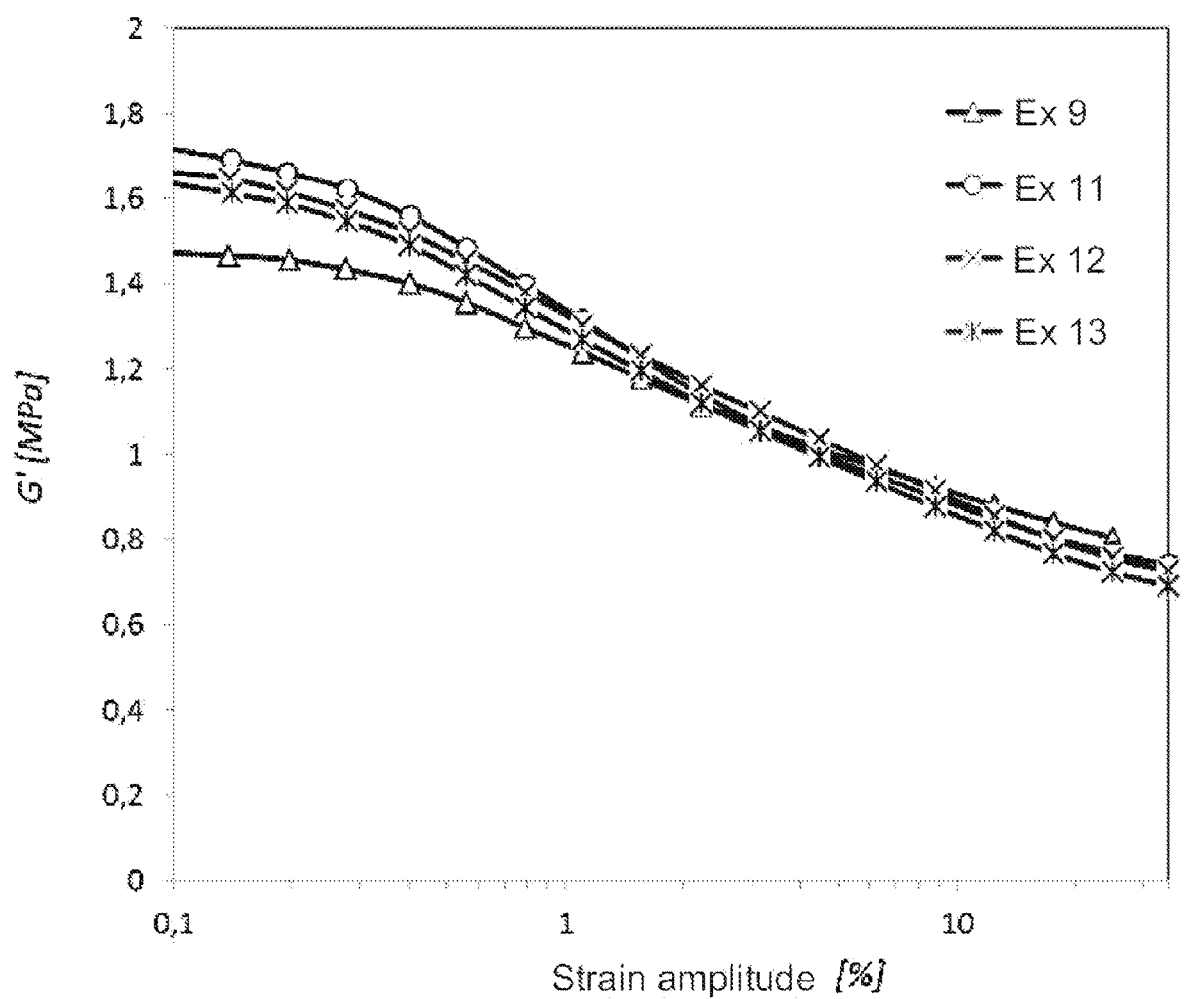
FIG. 5 shows the dynamic modulus G' as a function of the amplitude of the strain for the elastomeric compositions from examples 8, 9, 11, 12 in Table 1.

FIG. 5 shows the conservative dynamic modulus G' as a function of the amplitude of the strain for the elastomeric compositions in Examples 8, 9, 10 and 12.

Figure 6:
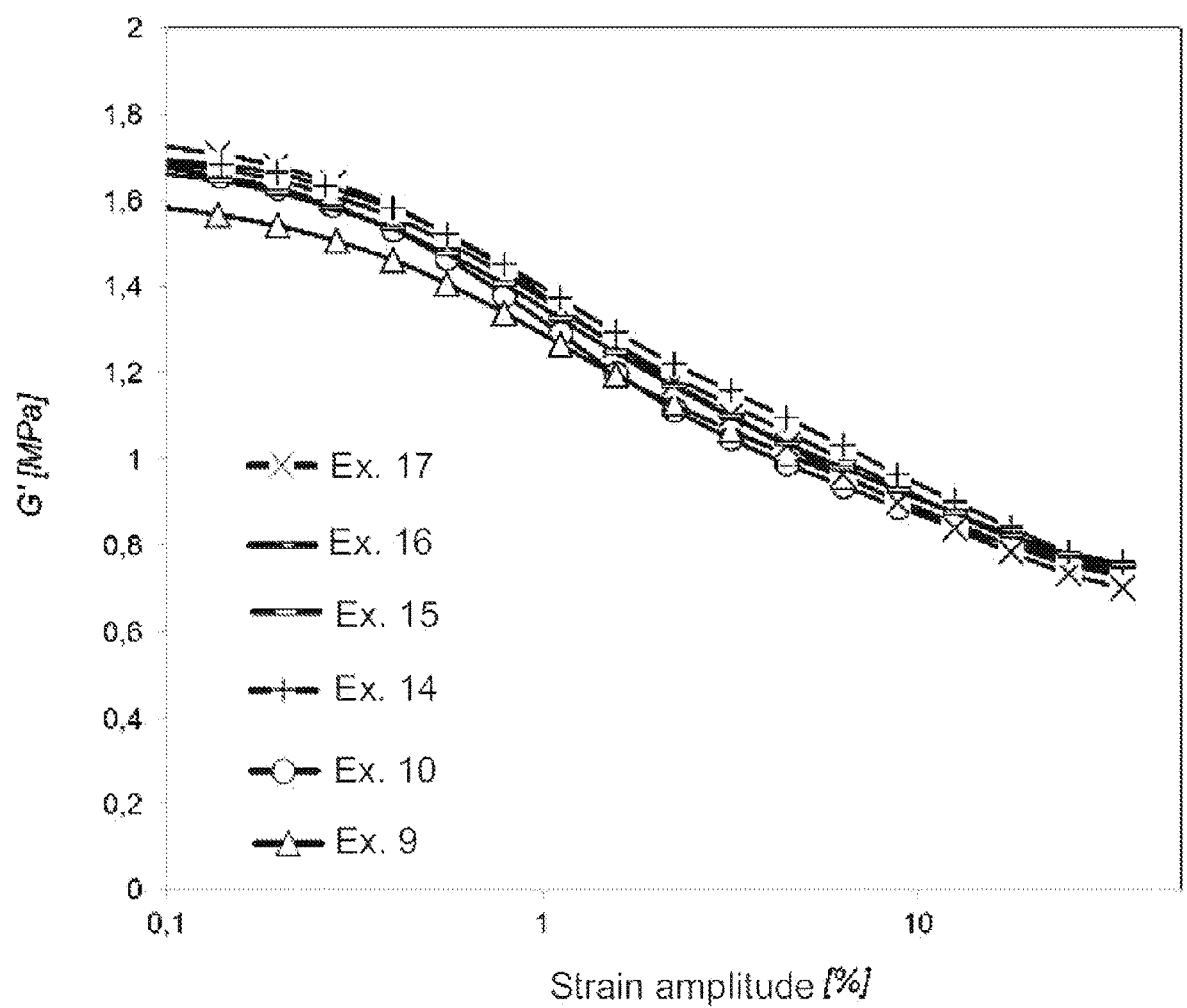
FIG. 6 shows the dynamic modulus G' as a function of the amplitude of the strain for the elastomeric compositions from Examples 8, 9, 13, 14, 15 in Table 1.

FIG. 6 shows the conservative dynamic modulus G' as a function of the amplitude of the strain for the elastomeric compositions in Examples 8, 9, 13, 14, 15.

Examples 16, 17, 18, 19

Tests of Extraction of the Secondary Accelerator from Silica

The tests were performed according to the operating procedure described above.

In example 16 (invention), serinol was used as secondary accelerator.

In example 17 (invention), serinol camphor was used as secondary accelerator.

In example 18 (invention), serinol cinnamaldehyde was used as secondary accelerator.

In example 19 (comparative), diphenylguanidine was used as secondary accelerator.

Table 5 shows the substances present in the hexane used for extraction. These substances were detected by GC-MS analysis.

TABLE 5

Tests of extraction of diphenyl guanidine and of molecules according to the present invention from silica

| Example | 16 | 17 | 18 | 19 |
|---|---|---|---|---|
| Accelerator[a] | serinol | serinol camphor (from example 4) | serinol cinnamaldehyde (from example 5) | diphenyl guanidine |
| Substance extracted[b] | none | camphor | cinnamaldehyde | diphenyl guanidine |

[a]Contacted with silica.
[b]Detected in the hexane used for extraction, by GC-MS analysis.

The data given in Table 5 show how DPG is extracted from its adduct with silica by a solvent such as hexane. In contrast, the accelerators according to the present invention are not extracted from the adducts with silica. In fact, there is no trace of these accelerators in the hexane used for extraction.

Examination of the data in Tables 2 to 5 shows that the class of secondary accelerators according to the present invention shows advantages relative to the compound without secondary accelerators. Moreover, this class of accel-

TABLE 4

Values of $G'_{y=0.28\%}$, $\Delta G'$, $G''_{max}$ and $(Tan\ Delta)_{max}$ determined by the strain sweep test for the elastomeric compositions in Table 1[a]

| Ex. prep. compound | | Ex. 8 | Ex. 9 | Ex. 10 | Ex. 11 | Ex. 12 | Ex. 13 | Ex. 14 | Ex. 15 |
|---|---|---|---|---|---|---|---|---|---|
| $G'_{y=0.28\%}$ | MPa | 1.43 | 1.621 | 1.64 | 1.6142 | 1.587 | 1.6322 | 1.5811 | 1.61 |
| $\Delta G'$ | MPa | 0.65 | 0.92 | 0.92 | 0.8886 | 0.8961 | 0.8733 | 0.829 | 0.8768 |
| $G''_{max}$ | MPa | 0.169 | 0.18 | 0.19 | 0.1827 | 0.1911 | 0.2062 | 0.2035 | 0.2269 |
| $(Tan\ Delta)_{max}$ | — | 0.149 | 0.153 | 0.151 | 0.155 | 0.163 | 0.164 | 0.165 | 0.178 |

[a]$G'_{y=0.28\%}$ = value of G' at the minimum strain, equal to 0.28%. ΔG' = difference between the value of G' at minimum strain and the value of G' measured at the maximum strain reached. $G''_{max}$ = maximum value of G" observed on the curve of G" (Tan Delta)$_{max}$ = maximum value of tan delta observed on the curve.

The values for the parameters given in Table 4, measured by the dynamic-mechanical tests, seem to be substantially in line for all the compounds. In particular, the value of ΔG' is taken as an indicator of the phenomenon of formation and destruction of the network of the filler and therefore as an indicator of dissipation of energy. Thus, the secondary accelerators according to the present invention do not cause significant dissipation of energy.

erators offers the possibility of selecting the ideal chemical compound for the desired properties of the compound itself.

Examples 20 (Comparative), 21 (Invention) and 22 (Invention)

Table 6 gives other examples of elastomeric compositions according to the present invention.

TABLE 6

Formulations for elastomeric compositions

| Ingredient | Ex. 20 | Ex. 21 | Ex. 22 |
|---|---|---|---|
| | | Phr | |
| S-SBR HP755[a] | 90.00 | 90.00 | 90.00 |
| BR[b] | 35.00 | 35.00 | 35.00 |
| Silica[c] | 50.00 | 50.00 | 50.00 |
| Silane TESPT/Carbon black[d] | 11.20 | 11.20 | 11.20 |
| Silica Zeosil 1165[e] | 20.00 | 20.00 | 20.00 |
| MES oil[f] | 8.00 | 8.00 | 8.00 |
| Stearic acid[g] | 2.00 | 2.00 | 2.00 |
| Zinc oxide[h] | 2.50 | 2.50 | 2.50 |
| 6PPD[i] | 2.00 | 2.00 | 2.00 |
| Sulphur[k] | 1.20 | 1.20 | 1.20 |
| TBBS[l] | 2.00 | 2.00 | 2.00 |
| DPG80[m] | 2.40 | 0.00 | 0.00 |
| Serinol[n] | 0.00 | 0.83 | 0.00 |
| Camphor imine (Ex. 4) | 0.00 | 0.00 | 2.04 |

[a]Styrene-butadiene rubber from solution; commercial grade Styron 4630, from Styron. 25% as styrene content
[b]Polybutadiene; commercial grade Europrene neocis, from Polimeri Europa
[c,e]ZEOSIL 1165MP, from SOLVAY RHODIA OPERATIONS
[d]Silane TESPT: bis[3-(triethoxysilyl)propyl]tetrasulphide TESPT/Carbon black N330 = 1/1, from EVONIK
[f]Aliphatic oil, from Eni
[g]Stearin N, from SOGIS
[h]from Zincol Ossidi
[i]N-(1,3-dimethylbutyl)-N'-phenyl-p-phenylenediamine, from Crompton.
[k]from Solfotecnica
[l]N-tert-butyl-2-benzothiazyl sulphenamide, from Flexsys
[m]Diphenylguanidine (Rhenogran ® DPG80), from Rhein Chemie Additives
[n]2-amino-1,3-propanediol, from Bracco

TABLE 7

Values of $M_L$, $M_H$, $t_{s1}$, $t_{90}$ determined by the rheometric test for the elastomeric compositions in Table 6[a]

| Ex. prep. compound | | 20 | 21 | 22 |
|---|---|---|---|---|
| $M_L$ | [dNm] | 3.26 | 4.06 | 3.53 |
| $M_H$ | [dNm] | 20.43 | 20.53 | 19.83 |
| $t_{s1}$ | [min] | 0.97 | 0.7 | 1.09 |
| $t_{90}$ | [min] | 3.06 | 3.71 | 4.69 |

[a]$M_L$ minimum torque value, measured in dNewton × meter (dNm). $M_H$ maximum torque value, measured in dNm. $T_{s1}$: time taken for an increase of 1 dNm in the torque value, relative to the minimum value $M_L$. $T_{90}$: time taken to reach 90% of the torque value, relative to the maximum value $M_H$.

It can be seen from the data in Table 7 that the compounds containing DPG and serinol camphor have similar vulcanization induction times, whereas a shorter time is obtained with serinol as secondary accelerator. Serinol camphor also gives a lower vulcanization rate. It can therefore be seen that different vulcanization kinetics may be obtained with molecules according to the present invention, ascribable to the same general formula. By modulating the chemical nature of the molecules according to the present invention it is thus possible to modulate the vulcanization kinetics.

TABLE 8

Values of $G'_{\gamma\,=\,0.28\%}$, $\Delta G'$ and (Tan Delta)$_{max}$ determined by the strain sweep test for the elastomeric compositions in Table 6[a]

| Ex. prep. compound | | 20 | 21 | 22 |
|---|---|---|---|---|
| $G'_{\gamma\,=\,0.28\%}$ | MPa | 2.80 | 2.64 | 2.46 |
| $\Delta G'$ | MPa | 1.73 | 1.55 | 1.45 |
| (Tan Delta)$_{max}$ | — | 0.200 | 0.190 | 0.195 |

[a]$G'_{\gamma\,=\,0.28\%}$ = value of G' at the minimum strain, equal to 0.28%. $\Delta G'$ = difference between the value of G' at minimum strain and the value of G' measured at the maximum strain reached. (Tan Delta)$_{max}$ = maximum value of tan delta observed on the curve.

It can be seen from the data in Table 8 that the greatest non-linearity of the modulus is obtained with the compound prepared with DPG. There is lower dissipation of energy with serinol camphor, and even lower with serinol.

Examples 23 (Comparative), 24 (Comparative), 25 (Invention) and 26 (Invention)

Table 9 gives other examples of elastomeric compositions according to the present invention. The composition envisages silica as reinforcing filler.

TABLE 9

Formulations for elastomeric compositions

| Ingredient | Ex. 23 | Ex. 24 | Ex. 25 | Ex. 26 |
|---|---|---|---|---|
| | | Phr | | |
| NR[a] | 15.00 | 15.00 | 15.00 | 15.00 |
| BR[b] | 15.00 | 15.00 | 15.00 | 15.00 |
| HP755[c] | 96.25 | 96.25 | 96.25 | 96.25 |
| Silica[d] | 85.00 | 85.00 | 85.00 | 85.00 |
| Silane TESPT/Carbon black N330 = 1/1[e] | 13.00 | 13.00 | 13.00 | 13.00 |
| Stearic acid[f] | 2.00 | 2.00 | 2.00 | 2.00 |
| TDAE oil[g] | 8.00 | 8.00 | 8.00 | 8.00 |
| TMQ[h] | 1.25 | 1.25 | 1.25 | 1.25 |
| Wax[i] | 1.25 | 1.25 | 1.25 | 1.25 |
| Adhesive resin[k] | 4.50 | 4.50 | 4.50 | 4.50 |
| Zinc oxide[l] | 2.50 | 2.50 | 2.50 | 2.50 |
| 6PPD[m] | 2.00 | 2.00 | 2.00 | 2.00 |
| AMPD[n] | 0.00 | 0.00 | 1.50 | 0.00 |
| TRIS AMINO[o] | 0.00 | 0.00 | 0.00 | 1.50 |
| Sulphur[p] | 1.40 | 1.40 | 1.40 | 1.40 |
| TBBS[q] | 2.00 | 2.00 | 2.00 | 2.00 |
| DPG80[r] | 0.00 | 2.50 | 0.00 | 0.00 |
| PVI[s] | 0.20 | 0.20 | 0.20 | 0.20 |

[a]SMR GP = Natural rubber (poly(1,4-cis)isoprene, supplier SENG HIN RUBBER)
[b]BR40 Europrene neocis = High cis polybutadiene (97% min). Neodymium polymerized. (supplier VERSALIS)
[c]HP755 = Solution Styrene-butadiene copolymer (styrene 39.5% and vinyl 38.5% on the dienic portion equivalent to 23.3% on the polymer), extended with 37.5 phr of TDAE oil (SUPPLIER JAPAN SYNTHETIC RUBBER)
[d]SILICA ZEOSIL 1165MP (supplier SOLVAY RHODIA OPERATIONS)
[e]TESPT (50%) = Silane TESPT/Carbon black N330 = 1/1 = "Bis[3-(triethoxysilyl)propyl] tetrasulphide (supplier EVONIK)
[f]STEARIC acid = STEARIN N (supplier: SOGIS)
[g]TDAE oil = Treated distillate aromatic extract (TDAE) VIVATEC 500 Supplier: H&R
[h]TMQ = 2,2,4-trimethyl-1,2-dihydroquinoline polymerized (trade name = VULCANOX HS/LG; supplier = LANXESS)
[i]WAX = Mixture of normal-paraffins, prevailing, and iso-paraffins (trade name: REDEZON 517 supplier REPSOL YPF)
[k]ADHESIVE RESIN = ALPHA-METHYL-STYRENE THERMOPLASTIC RESIN (trade name: IMPERA P1504 Supplier EASTMAN)
[l]ZINC OXIDE (supplier = ZINCOL OSSIDI)
[m]6PPD = N-(1,3-dimethylbutyl)-N'-phenyl-p-phenylenediamine (6PPD) (from Crompton)
[n]2-amino-2-methylpropane-1,3-diol (AMPD) (from ANGUS).
[o]Tris(hydroxymethyl)aminomethane (TRIS AMINO) (from ANGUS),
[p]Sulphur (from ZOLFINDUSTRIA)
[q]N-tert-butyl-2-benzothiazyl sulphenamide (TBBS) (from Flexsys)
[r]Diphenylguanidine (Rhenogran ® DPG80) (from Rhein Chemie Additives)
[s]N-cyclohexyl-thiophthalimide (PVI) (Vulkalent ®G, from Lanxess)

Table 10 gives the data relating to the vulcanization reactions.

TABLE 10

Values of $M_L$, $M_H$, $t_{s1}$, $t_{60}$, $t_{90}$ determined by the rheometric test for the elastomeric compositions in TABLE 9[a]

| Ex. prep. compound | | 23 | 24 | 25 | 26 |
|---|---|---|---|---|---|
| $M_L$ | [dNm] | 5.6 | 3.8 | 4.0 | 4.4 |
| $M_H$ | [dNm] | 20.2 | 20.4 | 20.6 | 21.4 |
| $t_{s1}$ | [min] | 1.33 | 0.59 | 0.58 | 0.5 |

TABLE 10-continued

Values of $M_L$, $M_H$, $t_{s1}$, $t_{60}$, $t_{90}$ determined by the rheometric test for the elastomeric compositions in TABLE 9[a]

| Ex. prep. compound | | 23 | 24 | 25 | 26 |
|---|---|---|---|---|---|
| $t_{60}$ | [min] | 4.83 | 3.00 | 3.2 | 3.19 |
| $t_{90}$ | [min] | 10.92 | 5.28 | 6.35 | 7.31 |

[a]$M_L$ minimum torque value, measured in dNewton × meter (dNm). $M_H$ maximum torque value, measured in dNm. $T_{s1}$: time taken for a 1 dNm increase in the torque value, relative to the minimum value $M_L$. $t_{60}$: time taken to reach 60% of the torque value, relative to the maximum value $M_H$. $t_{90}$: time taken to reach 90% of the torque value, relative to the maximum value $M_H$.

It can be seen from the data given in Table 10 that both DPG and the molecules according to the present invention are very effective in reducing the value of $M_L$, a parameter indicative of the viscosity of the crude product:

The acceleration of the vulcanization kinetics is similar for DPG and for the molecules according to the present invention. The latter appear to reduce the reversion of the compound.

Table 11 gives data obtained from the tensile tests

TABLE 11

Values of the tensile properties for the elastomeric compositions in Table 9a

| | | Ex. prep. compound | | | |
|---|---|---|---|---|---|
| | | 23 | 24 | 25 | 26 |
| Samples held at 23° C. for 5 min | | | | | |
| Ca0.5 | [Mpa] | 1.13 | 1.34 | 1.32 | 1.30 |
| Ca1 | [Mpa] | 1.72 | 2.25 | 2.2 | 2.11 |
| Ca3 | [Mpa] | 6.44 | 9.81 | 9.18 | 8.61 |
| CR | [Mpa] | 17.06 | 18.38 | 18.18 | 15.68 |
| AR | [%] | 668.4 | 534.8 | 551.5 | 511.4 |

[a]$Ca_{05}$, $Ca_1$, $Ca_3$: load at different levels of elongation, 50%, 100% and 300% respectively. CR: breaking load. AR: elongation at break The data in Table 11 show that AMPD reproduces the effect of DPG, whereas TRIS-AMINO leads to slightly lower reinforcement, but much greater than that of the reference without secondary accelerator.

Table 12 gives the data obtained from the dynamic mechanical tests.

TABLE 12

Values of the dynamic mechanical properties for the elastomeric compositions in TABLE 9[a]

| Ex. prep. compound | | 23 | 24 | 25 | 26 |
|---|---|---|---|---|---|
| Measurements taken at 0° C. | | | | | |
| E' | [Mpa] | 16.01 | 16.89 | 16.48 | 16.68 |
| Tan delta | | 0.771 | 0.736 | 0.734 | 0.739 |
| Measurements taken at 10° C. | | | | | |
| E' | [Mpa] | 11.39 | 12.44 | 12.19 | 12.14 |
| Tan delta | | 0.62 | 0.602 | 0.592 | 0.599 |
| Measurements taken at 23° C. | | | | | |
| E' | [Mpa] | 8.67 | 9.57 | 9.46 | 9.44 |
| Tan delta | | 0.414 | 0.399 | 0.385 | 0.395 |
| Measurements taken at 70° C. | | | | | |
| E' | [Mpa] | 5.42 | 6.15 | 6.07 | 5.98 |
| Tan delta | | 0.192 | 0.180 | 0.178 | 0.185 |

[a]E': dynamic elastic modulus. Tan delta: ratio of the loss modulus (E") to the elastic modulus (E').

The dynamic-mechanical data in Table 12 show substantial equivalence of the compounds obtained with the accelerators according to the invention relative to DPG.

Table 13 gives the data obtained from the abrasion tests.

TABLE 13

Values of volume loss (DIN abrasion test) for the elastomeric compositions in TABLE 9

| Ex. prep. compound | | 23 | 24 | 25 | 26 |
|---|---|---|---|---|---|
| Volume loss | [mm³] | 173 | 107 | 105 | 114 |

The DIN abrasion data in Table 13 show substantial equivalence of the compounds obtained with the accelerators according to the invention relative to DPG. Poorer DIN abrasion was obtained in the case of the compound without secondary accelerators.

Examples 27 (Comparative), 28 (Comparative), 29 (Invention), 30 (Invention) and 31 (Invention)

Table 14 gives other examples of elastomeric compositions according to the present invention. The composition envisages carbon black as reinforcing filler.

TABLE 14

Formulations for elastomeric compositions

| Ingredient | Ex. 27 | Ex. 28 | Ex. 29 | Ex. 30 | Ex. 31 |
|---|---|---|---|---|---|
| | | | Phr | | |
| NR[a] | 60.00 | 60.00 | 60.00 | 60.00 | 60.00 |
| BR[b] | 40.00 | 40.00 | 40.00 | 40.00 | 40.00 |
| Carbon black N115[c] | 55.00 | 55.00 | 55.00 | 55.00 | 55.00 |
| Silica VN3[d] | 15.00 | 15.00 | 15.00 | 15.00 | 15.00 |
| Silane TESPT/Carbon black N330 = 1/1[e] | 3.00 | 3.00 | 3.00 | 3.00 | 3.00 |
| Stearic acid[f] | 1.30 | 1.30 | 1.30 | 1.30 | 1.30 |
| Zinc oxide[g] | 3.00 | 3.00 | 3.00 | 3.00 | 3.00 |
| Zinc stearate[h] | 2.00 | 2.00 | 2.00 | 2.00 | 2.00 |
| Wax[i] | 2.00 | 2.00 | 2.00 | 2.00 | 2.00 |
| TMQ[k] | 1.00 | 1.00 | 1.00 | 1.00 | 1.00 |
| 6PPD[l] | 3.00 | 3.00 | 3.00 | 3.00 | 3.00 |
| Sulphur[m] | 1.80 | 1.80 | 1.80 | 1.80 | 1.80 |
| CBS[n] | 1.10 | 1.10 | 1.10 | 1.10 | 1.10 |
| DPG80[o] | 0.00 | 1.25 | 0.00 | 0.00 | 0.00 |
| AMPD[p] | 0.00 | 0.00 | 0.75 | 1.00 | 0.00 |
| TRIS AMINO[q] | 0.00 | 0.00 | 0.00 | 0.00 | 1.00 |
| PVI[r] | 0.30 | 0.30 | 0.30 | 0.30 | 0.30 |

[a]SMR GP = Natural rubber (poly(1,4-cis)isoprene, supplier SENG HIN RUBBER)
[b]BR40 Europrene neocis = High cis polybutadiene (97% min.). From catalysis with neodymium. (supplier VERSALIS)
[c]from Cabot
[d]ULTRASIL ® VN 3 GR from Evonik
[e]from Evonik; Silane TESPT: bis[3-(triethoxysilyl)propyl]tetrasulphide
[f]Radiacid 444 (Oleon)
[g]from Zincol Ossidi
[h]from Sogis
[i]WAX = Mixture of normal-paraffins, prevailing, and iso-paraffins (trade name: REDEZON 517 supplier REPSOL YPF)
[k]TMQ = 2,2,4-trimethyl-1,2-dihydroquinoline polymerized (trade name = VULCANOX HS/LG; supplier = LANXESS)
[l]6PPD = N-(1,3-dimethylbutyl)-N'-phenyl-p-phenylenediamine (6PPD) (from Crompton)
[m]Sulphur (from ZOLFINDUSTRIA)
[n]N-cyclohexyl-2-benzothiazyl sulphenamide (CBS) (from Flexsys)
[o]Diphenylguanidine (Rhenogran ® DPG80) (from Rhein Chemie Additives)
[p]2-amino-2-methylpropane-1,3-diol (AMPD) (from ANGUS).
[q]Tris(hydroxymethyl)aminomethane (TRIS AMINO) (from ANGUS),
[r]N-cyclohexyl-thiophthalimide (PVI) (Vulkalent ®G, from Lanxess)

Table 15 gives the data relating to the vulcanization reactions. Vulcanization conditions, 140° C. and 120 minutes, were selected that are typical for formulations of this type, when they are applied for example in tyres for use in agriculture.

TABLE 15

Values of $M_L$ and of scorch time $t_{s5}$ determined by the scorch test for the elastomeric compositions prepared in Table 14[a]

| Ex. prep. compound | | 27 | 28 | 29 | 30 | 31 |
|---|---|---|---|---|---|---|
| $M_L$ | [dNm] | 10.54 | 9.67 | 9.16 | 9.52 | 9.57 |
| $t_{s5}$ | [min] | 30.3 | 16.5 | 23.2 | 22.5 | 19.3 |

[a]ML: minimum value of Modulus; Scorch time = $t_{s5}$ = time required for an increase in torque equal to 5 dNm.

$M_L$ is indicative of the viscosity of the crude product. It can be seen from the data in Table 15 that DPG is very effective in reducing it, and that the two molecules according to the present invention give similar results, even better than DPG in the case of TRIS-AMINO. The t5 at 130° C. is indicative of the window of processability of the compounds: it is desirable for it to be at least 15 minutes to avoid potential process problems: DPG leads to values that are acceptable but potentially critical, while the two molecules according to the present invention show improving results.

TABLE 16

Values of $M_L$, $M_H$, $t_{s1}$, $t_{60}$, $t_{90}$ determined by the rheometric test carried out at 140° C. for 120 minutes, for the elastomeric compositions in Table 14[a]

| Ex. prep. compound | | 27 | 28 | 29 | 30 | 31 |
|---|---|---|---|---|---|---|
| $M_L$ | [dNm] | 5.2 | 4.8 | 4.7 | 4.8 | 5.0 |
| $M_H$ | [dNm] | 23.7 | 27.2 | 26.6 | 27.8 | 28.7 |
| $t_{s1}$ | [min] | 10.8 | 5.8 | 8.3 | 7.5 | 7.5 |
| $t_{60}$ | [min] | 33.5 | 19.2 | 24.9 | 24.0 | 21.3 |
| $t_{90}$ | [min] | 55.9 | 35.8 | 44.2 | 40.9 | 36.5 |

[a]$M_L$ minimum torque value, measured in dNewton x meter (dNm). $M_H$ maximum torque value, measured in dNm. $T_{s1}$: time taken for a 1 dNm increase in the torque value, relative to the minimum value $M_L$. $t_{60}$: time taken to reach 60% of the torque value, relative to the maximum value $M_H$. $t_{90}$: time taken to reach 90% of the torque value, relative to the maximum value $M_H$.

It can be seen from the data in Table 16 that both DPG and the molecules according to the present invention are effective in reducing the values of $M_L$, indicative of the viscosity of the crude product. In particular, a larger reduction is obtained in the case of TRIS-AMINO.

All the molecules added to the formulation with the role of secondary accelerator, both DPG and the molecules according to the present invention, cause a decrease in the vulcanization times, from the induction time to vulcanization $t_{s1}$, to the reference times for the formation of the network $t_{60}$ and $t_{90}$.

Table 17 gives the values obtained from the tensile tests.

TABLE 17

Values of the tensile properties for the elastomeric compositions prepared in the examples in Table 14[a]

| Ex. prep. compound | | 27 | 28 | 29 | 30 | 31 |
|---|---|---|---|---|---|---|
| Hardness @ 23° C. | IRHD | 76.8 | 80.6 | 78.9 | 80.6 | 80.7 |
| Hardness @ 70° C. | IRHD | 69.9 | 73.2 | 72.6 | 73.8 | 74.1 |
| Samples held at 23° C. for 5 min | | | | | | |
| $Ca_{0.5}$ | [Mpa] | 1.74 | 2.08 | 1.99 | 2.13 | 2.14 |
| $Ca_1$ | [Mpa] | 2.81 | 3.55 | 3.36 | 3.64 | 3.69 |

TABLE 17-continued

Values of the tensile properties for the elastomeric compositions prepared in the examples in Table 14[a]

| Ex. prep. compound | | 27 | 28 | 29 | 30 | 31 |
|---|---|---|---|---|---|---|
| $Ca_3$ | [Mpa] | 12.63 | 15.08 | 14.71 | 15.47 | 15.59 |
| CR | [Mpa] | 20.65 | 21.08 | 21.16 | 21.74 | 19.07 |
| AR | [%] | 501 | 445 | 447 | 449 | 395 |

[a]$Ca_{05}$, $Ca_1$, $Ca_3$: load at different levels of elongation, 50%, 100% and respectively. CR: breaking load. AR: elongation at break 300%

It can be seen from the data in Table 17 that both DPG and the molecules according to the present invention cause an increase in hardness IRHD both at 23° C. and at 70° C. However, DPG also leads to an undesirable increase in the hardness difference between 23° C. and 70° C.

TABLE 18

Values of the dynamic mechanical properties for the elastomeric compositions in Table 14[a]

| Ex. prep. compound | | 27 | 28 | 29 | 30 | 31 |
|---|---|---|---|---|---|---|
| Measurements taken at 10° C. | | | | | | |
| E' | [Mpa] | 9.93 | 10.96 | 10.52 | 10.87 | 11.27 |
| Tan delta | | 0.297 | 0.284 | 0.282 | 0.288 | 0.282 |
| Measurements taken at 23° C. | | | | | | |
| E' | [Mpa] | 9.10 | 9.96 | 9.58 | 10.19 | 10.28 |
| Tan delta | | 0.264 | 0.250 | 0.247 | 02512 | 0.248 |
| Measurements taken at 70° | | | | | | |
| E' | [Mpa] | 7.03 | 7.83 | 7.54 | 7.77 | 8.07 |
| Tan delta | | 0.206 | 0.193 | 0.188 | 0.193 | 0.187 |

[a]E': dynamic elastic modulus. Tan delta: ratio of the loss modulus (E") to the elastic modulus (E').

Table 19 gives the data obtained from the abrasion tests.

TABLE 19

Values of volume loss (abrasion test) for the elastomeric compositions in Table 14

| Ex. prep. compound | | 27 | 28 | 29 | 30 | 31 |
|---|---|---|---|---|---|---|
| Volume loss | [mm³] | 35.4 | 34.6 | 34.8 | 34.7 | 35.1 |

Results that are substantially equivalent are thus obtained with DPG and with the molecules according to the present invention both with respect to the dynamic loads and with respect to abrasion.

The invention claimed is:
1. A vulcanizable elastomeric composition comprising:
at least one diene elastomer,
at least one reinforcing filler,
at least one sulfur based vulcanization system, and
at least one compound of formula (I)

wherein the compound of formula (I) is present in an amount ranging from 0.3 phr to 20 phr, and wherein X is chosen from:

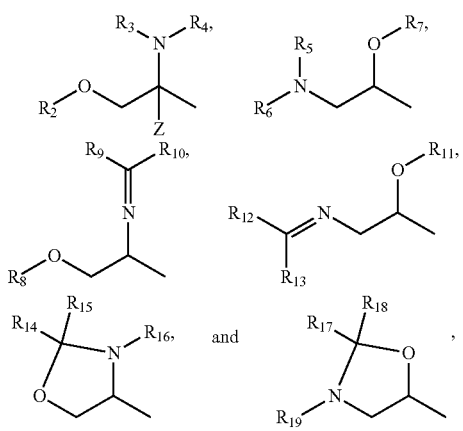

wherein:
R$_1$, R$_2$, R$_7$, R$_8$, R$_{11}$, R$_{16}$ and R$_{19}$ are independently chosen from: hydrogen, C$_1$-C$_{22}$ linear or branched alkyl, C$_2$-C$_{22}$ linear or branched alkenyl or alkinyl, aryl, C$_1$-C$_{22}$ linear or branched alkyl-aryl, C$_2$-C$_{22}$ linear or branched alkenyl-aryl, C$_2$-C$_{22}$ linear or branched alkinyl-aryl, C$_2$-C$_{22}$ linear or branched acyl-alkyl, C$_3$-C$_{22}$ linear or branched acyl-alkenyl or acyl-alkinyl, acyl-aryl, acyl-alkyl-aryl with C$_2$-C$_{22}$ linear or branched acyl-alkyl, acyl-alkenyl-aryl with C$_3$-C$_{22}$ linear or branched acyl-alkenyl, acyl-alkinyl-aryl with C$_3$-C$_{22}$ linear or branched acyl-alkinyl, and heteroaryl;

at least one of R$_3$ and R$_4$ and at least one of R$_5$ and R$_6$ is hydrogen;

only one of R$_3$ and R$_4$ and only one of R$_5$ and R$_6$ are chosen from acyl, acyl-aryl, acyl-alkyl-aryl with C$_2$-C$_{22}$ linear or branched acyl-alkyl, acyl-alkenyl-aryl with C$_3$-C$_{22}$ linear or branched acyl-alkenyl, and acyl-alkinyl-aryl with C$_3$-C$_{22}$ linear or branched acyl-alkinyl;

Z is chosen from: hydrogen, methyl, ethyl, and hydroxymethyl;

R$_9$ and R$_{10}$ are independently chosen from: hydrogen, a C$_2$-C$_{22}$ linear or branched alkenyl group, a C$_2$-C$_{22}$ linear or branched alkylidene group, an aryl group, and an alkyl-aryl group with C$_1$-C$_{22}$ linear or branched alkyl, wherein:
R$_9$ and R$_{10}$ are not simultaneously hydrogen;
or R$_9$ and R$_{10}$ may form a ring, which may contain from 3 to 20 atoms and one or two heteroatoms selected from O or N, wherein:
when the ring comprises one or two heteroatoms the total number of ring atoms is 5 or 6;
when the ring contains two heteroatoms, the heteroatoms may be in position 1,2 or 1,3, when position 1 is the position nearest to the carbon atom of the imine group;
or R$_9$ and R$_{10}$ may form polycycles formed by a number of carbon atoms which can range from 5 to 20, fused or spiro, with or without bridgehead atoms;

R$_{12}$ and R$_{13}$ are independently chosen from: hydrogen, a C$_2$-C$_{22}$ linear or branched alkenyl group, a C$_2$-C$_{22}$ linear or branched alkylidene group, an aryl group, and an alkyl-aryl group with C$_1$-C$_{22}$ linear or branched alkyl, wherein:
R$_{12}$ and R$_{13}$ are not simultaneously hydrogen;
or R$_{12}$ and R$_{13}$ may form a ring, which may contain from 3 to 20 atoms and one or two heteroatoms selected from O or N, wherein:

when the ring comprises one or two heteroatoms, the total number of ring atoms is 5 or 6;
when the ring contains two heteroatoms, the heteroatoms may be in position 1,2 or 1,3, when position 1 is the position that is nearest to the carbon atom of the imine group;
or R$_{12}$ and R$_{13}$ can form polycycles formed by a number of carbon atoms that can range from 5 to 20, fused or spiro, with or without bridgehead atoms;

R$_{14}$, R$_{15}$, R$_{17}$, and R$_{18}$ are independently chosen from: hydrogen, C$_1$-C$_{22}$ linear or branched alkyl with no branch on C$_1$, C$_2$-C$_{22}$ linear or branched alkenyl or alkinyl, alkyl-aryl with C$_1$-C$_{22}$ linear or branched alkyl with the aryl group not directly bound to the oxazolidine, alkenyl-aryl with C$_2$-C$_{22}$ linear or branched alkenyl with the aryl group not directly bound to the oxazolidine, alkinyl-aryl with C$_2$-C$_{22}$ linear or branched alkinyl with the aryl group not directly bound to the oxazolidine, C$_2$-C$_{22}$ linear or branched acyl-alkyl, and C$_3$-C$_{22}$ linear or branched acyl-alkenyl or acyl-alkinyl;

or R$_{14}$, R$_{15}$, R$_{17}$, and R$_{18}$ may form cycles of 5 and 6 carbon atoms.

2. The composition according to claim 1, wherein R$_1$ is hydrogen.

3. The composition according to claim 1, wherein X is:

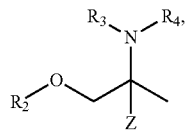

R$_2$ is chosen from: H, CH$_3$, and CH$_2$(CH$_2$)$_n$CH$_3$ with n from 0 to 16;

R$_3$ and R$_4$ are hydrogen; and

Z is chosen from: hydrogen, methyl, ethyl, and hydroxymethyl.

4. The composition according to claim 3, wherein n is from 0 to 9.

5. The composition according to claim 3, wherein R$_2$ is hydrogen.

6. The composition according to claim 1, wherein X is:

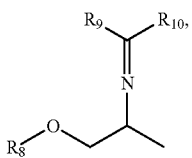

R$_9$ and R$_{10}$ form fused polycyclic formed by a number of carbon atoms from 7 to 9; and R$_8$ is chosen from: H, CH$_3$, and CH$_2$(CH$_2$)$_n$CH$_3$ with n from 0 to 16; or wherein R$_9$ is H, R$_{10}$ is —CH or —CH—C$_6$H$_5$ and R$_8$ is chosen from: H, —CH$_3$, and —CH$_2$(CH$_2$)$_n$CH$_3$ with n from 0 to 16.

7. The composition according to claim 6, wherein n is from 0 to 9.

8. The composition according to claim 1, wherein X is:

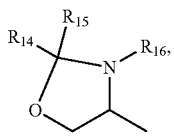

R$_{14}$ and R$_{15}$ may be the same or different from each other and are chosen from: —CH$_3$, —CH$_2$CH$_3$, —CH$_2$CH$_2$CH$_3$, —CH(CH$_3$)$_2$, and —CH$_2$CH(CH$_3$)$_2$; and R$_{16}$ is chosen from: H, —CH$_3$, and —CH$_2$(CH$_2$)$_n$CH$_3$ with n from 0 to 16.

9. The composition according to claim 8, wherein n is from 0 to 9.

10. The composition according to claim 1, wherein the compound of formula (I) is present in the elastomeric composition in an amount ranging from 0.4 to 10 phr.

11. The composition according to claim 10, wherein the compound of formula (I) is present in the elastomeric composition in an amount ranging from 0.5 phr to 5 phr.

12. The composition according to claim 1, wherein the diene elastomer contains unsaturations in the main polymer chain and has a glass transition temperature (T$_g$) lower than 20° C.

13. The composition according to claim 12, wherein the diene elastomer has a glass transition temperature (T$_g$) ranging from 0 to −90° C.

14. The composition according to claim 1, wherein the diene elastomer is chosen from: poly (1,4-cis-isoprene), poly (3,4-isoprene), poly (butadiene), isoprene/isobutene halogenated copolymers, 1,3-butadiene/acrylonitrile copolymers, styrene/1,3-butadiene copolymers, styrene/isoprene/1,3-butadiene copolymers, styrene/1,3-butadiene/acrylonitrile copolymers, and mixtures thereof.

15. The composition according to claim 1, wherein the composition further comprises an elastomer of one or more mono-olefins, wherein the mono-olefins are chosen from ethylene and 1-olefins with from 3 to 12 carbon atoms.

16. The composition according to claim 15, wherein the elastomer of one or more mono-olefins contains a diene with from 4 to 20 carbon atoms.

17. The composition according to claim 16, wherein the diene is chosen from: 1,3-butadiene, isoprene, 1,4-hexadiene, 1,4-cyclohexadiene, 5-ethylidene-2-norbornene, 5-methylene-2-norbornene, vinylnorbornene, and mixtures thereof.

18. The composition according to claim 16, wherein the diene is halogenated.

19. The composition according to claim 15, wherein the elastomer of one or more mono-olefins is chosen from: ethylene/propylene (EPR) copolymers or ethylene/propylene/diene (EPDM) copolymers, and poly (isobutene).

20. The composition according to claim 1, wherein the composition further comprises a primary accelerator chosen from triazoles, sulphenamides, and xanthogenates, and the primary accelerator is present in an amount ranging from 0.1 to 10 phr.

21. The composition according to claim 20, wherein the primary accelerator is present in an amount ranging from 0.5 to 5 phr.

22. The composition according to claim 1, wherein the reinforcing filler is chosen from: carbon black, silica, alumina, aluminosilicates, calcium carbonate, kaolin, and mixtures thereof; and is present in an amount ranging from 0.1 to 200 phr.

23. The composition according to claim 22, wherein the reinforcing filler is present in an amount ranging from 10 to 170 phr.

24. The composition according to claim 1, wherein the sulfur based vulcanization system comprises an amount of sulfur ranging from 0.5 to 10 phr.

25. The composition according to claim 24, wherein the sulfur based vulcanization system comprises an amount of sulfur ranging from 0.8 to 5 phr.

26. The composition according to claim 25, wherein the sulfur based vulcanization system comprises an amount of sulfur ranging from 1 phr to 3 phr.

27. A process for the vulcanization of elastomeric compositions comprising:

mixing at least one diene elastomer, at least one sulfur based vulcanization system, at least one reinforcing filler, optionally at least one accelerator chosen from: thiazoles, sulphenamides and xanthogenates, in an amount ranging from 0.1 to 10 phr, and at least one accelerator of formula (I)

to form a blend, wherein the compound of formula (I) is present in an amount from 0.3 phr to 20 phr, and wherein X is chosen from:

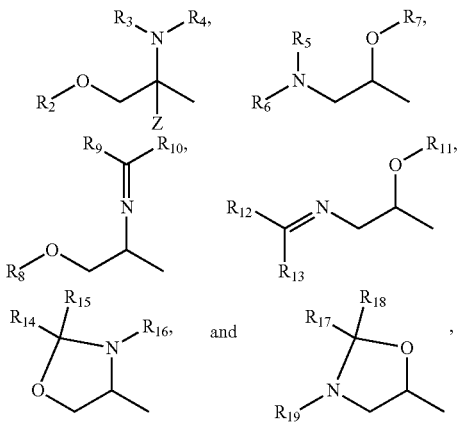

wherein:
R$_1$, R$_2$, R$_7$, R$_8$, R$_{11}$, R$_{16}$ and R$_{19}$ are independently chosen from: hydrogen, C$_1$-C$_{22}$ linear or branched alkyl, C$_2$-C$_{22}$ linear or branched alkenyl or alkinyl, aryl, C$_1$-C$_{22}$ linear or branched alkyl-aryl, C$_2$-C$_{22}$ linear or branched alkenyl-aryl, C$_2$-C$_{22}$ linear or branched alkinyl-aryl, C$_2$-C$_{22}$ linear or branched acyl-alkyl, C$_3$-C$_{22}$ linear or branched acyl-alkenyl or acyl-alkinyl, acyl-aryl, acyl-alkyl-aryl with C$_2$-C$_{22}$ linear or branched acyl-alkyl, acyl-alkenyl-aryl with C$_3$-C$_{22}$ linear or branched acyl-alkenyl, acyl-alkinyl-aryl with C$_3$-C$_{22}$ linear or branched acyl-alkinyl, and heteroaryl;

at least one of $R_3$ and $R_4$ and at least one of $R_5$ and $R_6$ is hydrogen;

only one of $R_3$ and $R_4$ and only one of $R_5$ and $R_6$ are chosen from acyl, acyl-aryl, acyl-alkyl-aryl with $C_2$-$C_{22}$ linear or branched acyl-alkyl, acyl-alkenyl-aryl with $C_3$-$C_{22}$ linear or branched acyl-alkenyl, and acyl-alkinyl-aryl with $C_3$-$C_{22}$ linear or branched acyl-alkinyl;

Z is chosen from: hydrogen, methyl, ethyl, and hydroxymethyl;

$R_9$ and $R_{10}$ are independently chosen from: hydrogen, a $C_2$-$C_{22}$ linear or branched alkenyl group, a $C_2$-$C_{22}$ linear or branched alkylidene group, an aryl group, and an alkyl-aryl group with $C_1$-$C_{22}$ linear or branched alkyl, wherein:

$R_9$ and $R_{10}$ are not simultaneously hydrogen;

or $R_9$ and $R_{10}$ may form a ring, which may contain from 3 to 20 atoms and one or two heteroatoms selected from 0 or N, wherein:

when the ring comprises one or two heteroatoms the total number of ring atoms is 5 or 6;

when the ring contains two heteroatoms, the heteroatoms may be in position 1,2 or 1,3, when position 1 is the position nearest to the carbon atom of the imine group;

or $R_9$ and $R_{10}$ may form polycycles formed by a number of carbon atoms which can range from 5 to 20, fused or spiro, with or without bridgehead atoms;

$R_{12}$ and $R_{13}$ are independently chosen from: hydrogen, a $C_2$-$C_{22}$ linear or branched alkenyl group, a $C_2$-$C_{22}$ linear or branched alkylidene group, an aryl group, and an alkyl-aryl group with $C_1$-$C_{22}$ linear or branched alkyl, wherein:

$R_{12}$ and $R_{13}$ are not simultaneously hydrogen;

or $R_{12}$ and $R_{13}$ may form a ring, which may contain from 3 to 20 atoms and one or two heteroatoms selected from O or N, wherein:

when the ring comprises one or two heteroatoms, the total number of ring atoms is 5 or 6;

when the ring contains two heteroatoms, the heteroatoms may be in position 1,2 or 1,3, when position 1 is the position that is nearest to the carbon atom of the imine group;

or $R_{12}$ and $R_{13}$ can form polycycles formed by a number of carbon atoms that can range from 5 to 20, fused or spiro, with or without bridgehead atoms;

$R_{14}$, $R_{15}$, $R_{17}$, and $R_{18}$ are independently chosen from: hydrogen, $C_1$-$C_{22}$ linear or branched alkyl with no branch on $C_1$, $C_2$-$C_{22}$ linear or branched alkenyl or alkinyl, alkyl-aryl with $C_1$-$C_{22}$ linear or branched alkyl with the aryl group not directly bound to the oxazolidine, alkenyl-aryl with $C_2$-$C_{22}$ linear or branched alkenyl with the aryl group not directly bound to the oxazolidine, alkinyl-aryl with $C_2$-$C_{22}$ linear or branched alkinyl with the aryl group not directly bound to the oxazolidine, $C_2$-$C_{22}$ linear or branched acyl-alkyl, and $C_3$-$C_{22}$ linear or branched acyl-alkenyl or acyl-alkinyl;

or $R_{14}$, $R_{15}$, $R_{17}$, and $R_{18}$ may form cycles of 5 and 6 carbon atoms; and heating the blend to a pressure ranging from $5\times10^5$ to $20\times10^5$ Pa, and at a temperature ranging from 120 to 200° C., for a time ranging from 5 to 200 minutes.

28. The process according to claim 27, wherein the accelerator chosen from: thiazoles, sulphenamides, and xanthogenates, is present in an amount ranging from 0.5 to 5 phr.

29. The process according to claim 27, wherein the pressure ranges from $13\times10^5$ to $18\times10^5$ Pa.

30. The process according to claim 27, wherein the temperature ranges from 140 to 180° C.

31. The process according to claim 27, wherein the time ranges from 10 to 40 minutes.

32. A tyre comprising at least one semi-finished product comprising a vulcanizable elastomeric composition comprising:

at least one diene elastomer,
at least one reinforcing filler,
at least one sulfur based vulcanization system, and
at least one compound of formula (I)

wherein the compound of formula (I) is present in an amount ranging from 0.3 phr to 20 phr, and wherein X is chosen from:

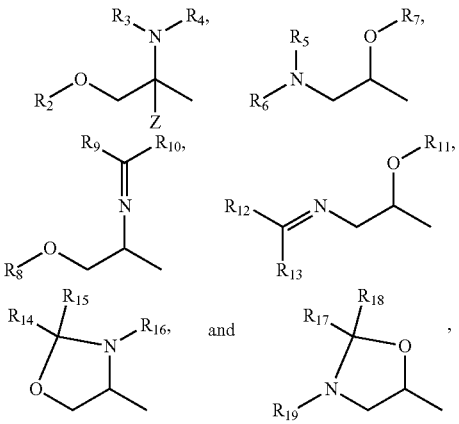

wherein:

$R_1$, $R_2$, $R_7$, $R_8$, $R_{11}$, $R_{16}$ and $R_{19}$ are independently chosen from: hydrogen, $C_1$-$C_{22}$ linear or branched alkyl, $C_2$-$C_{22}$ linear or branched alkenyl or alkinyl, aryl, $C_1$-$C_{22}$ linear or branched alkyl-aryl, $C_2$-$C_{22}$ linear or branched alkenyl-aryl, $C_2$-$C_{22}$ linear or branched alkinyl-aryl, $C_2$-$C_{22}$ linear or branched acyl-alkyl, $C_3$-$C_{22}$ linear or branched acyl-alkenyl or acyl-alkinyl, acyl-aryl, acyl-alkyl-aryl with $C_2$-$C_{22}$ linear or branched acyl-alkyl, acyl-alkenyl-aryl with $C_3$-$C_{22}$ linear or branched acyl-alkenyl, acyl-alkinyl-aryl with $C_3$-$C_{22}$ linear or branched acyl-alkinyl, and heteroaryl;

at least one of $R_3$ and $R_4$ and at least one of $R_5$ and $R_6$ is hydrogen;

only one of $R_3$ and $R_4$ and only one of $R_5$ and $R_6$ are chosen from acyl, acyl-aryl, acyl-alkyl-aryl with $C_2$-$C_{22}$ linear or branched acyl-alkyl, acyl-alkenyl-aryl with $C_3$-$C_{22}$ linear or branched acyl-alkenyl, and acyl-alkinyl-aryl with $C_3$-$C_{22}$ linear or branched acyl-alkinyl;

Z is chosen from: hydrogen, methyl, ethyl, and hydroxymethyl;

$R_9$ and $R_{10}$ are independently chosen from: hydrogen, a $C_2$-$C_{22}$ linear or branched alkenyl group, a $C_2$-$C_{22}$ linear or branched alkylidene group, an aryl group, and an alkyl-aryl group with $C_1$-$C_{22}$ linear or branched alkyl, wherein:

$R_9$ and $R_{10}$ are not simultaneously hydrogen;

or $R_9$ and $R_{10}$ may form a ring, which may contain from 3 to 20 atoms and one or two heteroatoms selected from O or N, wherein:

when the ring comprises one or two heteroatoms the total number of ring atoms is 5 or 6;

when the ring contains two heteroatoms, the heteroatoms may be in position 1,2 or 1,3, when position 1 is the position nearest to the carbon atom of the imine group;

or $R_9$ and $R_{10}$ may form polycycles formed by a number of carbon atoms which can range from 5 to 20, fused or spiro, with or without bridgehead atoms;

$R_{12}$ and $R_{13}$ are independently chosen from: hydrogen, a $C_2$-$C_{22}$ linear or branched alkenyl group, a $C_2$-$C_{22}$ linear or branched alkylidene group, an aryl group, and an alkyl-aryl group with $C_1$-$C_{22}$ linear or branched alkyl, wherein:

$R_{12}$ and $R_{13}$ are not simultaneously hydrogen;

or $R_{12}$ and $R_{13}$ may form a ring, which may contain from 3 to 20 atoms and one or two heteroatoms selected from O or N, wherein:

when the ring comprises one or two heteroatoms, the total number of ring atoms is 5 or 6;

when the ring contains two heteroatoms, the heteroatoms may be in position 1,2 or 1,3, when position 1 is the position that is nearest to the carbon atom of the imine group;

or $R_{12}$ and $R_{13}$ can form polycycles formed by a number of carbon atoms that can range from 5 to 20, fused or spiro, with or without bridgehead atoms;

$R_{14}$, $R_{15}$, $R_{17}$, and $R_{18}$ are independently chosen from: hydrogen, $C_1$-$C_{22}$ linear or branched alkyl with no branch on $C_1$, $C_2$-$C_{22}$ linear or branched alkenyl or alkinyl, alkyl-aryl with $C_1$-$C_{22}$ linear or branched alkyl with the aryl group not directly bound to the oxazolidine, alkenyl-aryl with $C_2$-$C_{22}$ linear or branched alkenyl with the aryl group not directly bound to the oxazolidine, alkinyl-aryl with $C_2$-$C_{22}$ linear or branched alkinyl with the aryl group not directly bound to the oxazolidine, $C_2$-$C_{22}$ linear or branched acyl-alkyl, and $C_3$-$C_{22}$ linear or branched acyl-alkenyl or acyl-alkinyl;

or $R_{14}$, $R_{15}$, $R_{17}$, and $R_{18}$ may form cycles of 5 and 6 carbon atoms.

33. The tyre according to claim 32, wherein at least one semi-finished product is a tread band.

34. The tyre according to claim 32, wherein the reinforcing filler comprises silica.

* * * * *

UNITED STATES PATENT AND TRADEMARK OFFICE
CERTIFICATE OF CORRECTION

PATENT NO. : 11,091,608 B2
APPLICATION NO. : 16/065587
DATED : August 17, 2021
INVENTOR(S) : Maurizio Stefano Galimberti et al.

It is certified that error appears in the above-identified patent and that said Letters Patent is hereby corrected as shown below:

On the Title Page

Item (73), "Assignee" after "PIRELLI TYRE S.p.A., MILAN (IT)," Insert:
-- POLITECNICO DI MILANO, MILAN (IT). --

Signed and Sealed this
Twenty-fifth Day of October, 2022

Katherine Kelly Vidal
*Director of the United States Patent and Trademark Office*